United States Patent [19]
Hasegawa

[11] Patent Number: 6,032,050
[45] Date of Patent: *Feb. 29, 2000

[54] METHOD FOR STANDBY CONTROL IN A MOBILE TELECOMMUNICATIONS NETWORK SETTING STANDBY CONDITIONS CONFORMING TO DIFFERENT MODES OF COMMUNICATION AND MOBILE UNIT USING SAME

[75] Inventor: Hajime Hasegawa, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/342,036

[22] Filed: Nov. 17, 1994

[30] Foreign Application Priority Data

May 20, 1994 [JP] Japan ................. 6-106856

[51] Int. Cl.$^7$ ..................................... H04B 7/00
[52] U.S. Cl. ..................... 455/517; 455/69; 455/522
[58] Field of Search ................. 455/33.1, 33.2, 455/33.4, 54.1, 54.2, 68, 69, 70, 88, 99, 422, 517, 524, 574, 522; 370/84; 340/825.44

[56] References Cited

U.S. PATENT DOCUMENTS

| | | | |
|---|---|---|---|
| 4,887,265 | 12/1989 | Felix | 455/33.2 |
| 4,939,785 | 7/1990 | Murata et al. | 455/54.1 |
| 5,228,074 | 7/1993 | Mizikovsky | 455/88 |
| 5,293,639 | 3/1994 | Wilson et al. | 455/69 |
| 5,335,225 | 8/1994 | Brax | 370/84 |
| 5,337,044 | 8/1994 | Folger et al. | 340/825.44 |
| 5,363,402 | 11/1994 | Harmon | 455/88 |
| 5,465,388 | 11/1995 | Zicker | 455/33.1 |
| 5,487,180 | 1/1996 | Ohtake | 455/54.1 |
| 5,493,693 | 2/1996 | Tanaka et al. | 455/33.1 |
| 5,504,803 | 4/1996 | Yamada et al. | 455/54.2 |
| 5,524,287 | 6/1996 | Yokoya et al. | 455/69 |
| 5,530,910 | 6/1996 | Taketsugu | 455/33.4 |
| 5,535,430 | 7/1996 | Aoki et al. | 455/54.1 |

FOREIGN PATENT DOCUMENTS 4-302230 10/1992 Japan .

Primary Examiner—Reinhard J. Eisenzopf
Assistant Examiner—Sam Bhattacharya
Attorney, Agent, or Firm—Staas & Halsey, LLP

[57] ABSTRACT

A method for standby control in a base station and a mobile unit, wherein the base station broadcasts information including standby control information having a plurality of types of standby conditions conforming to different modes of communication of the mobile units as standby conditions for the mobile units and wherein the mobile units recognize which of the several modes of communication they are in, extract from the broadcast information the standby condition corresponding to the recognized mode of communication, and execute standby control under the extracted standby condition, thereby enabling standby control under the communication conditions conforming to the modes of communication the mobile units are in.

25 Claims, 34 Drawing Sheets

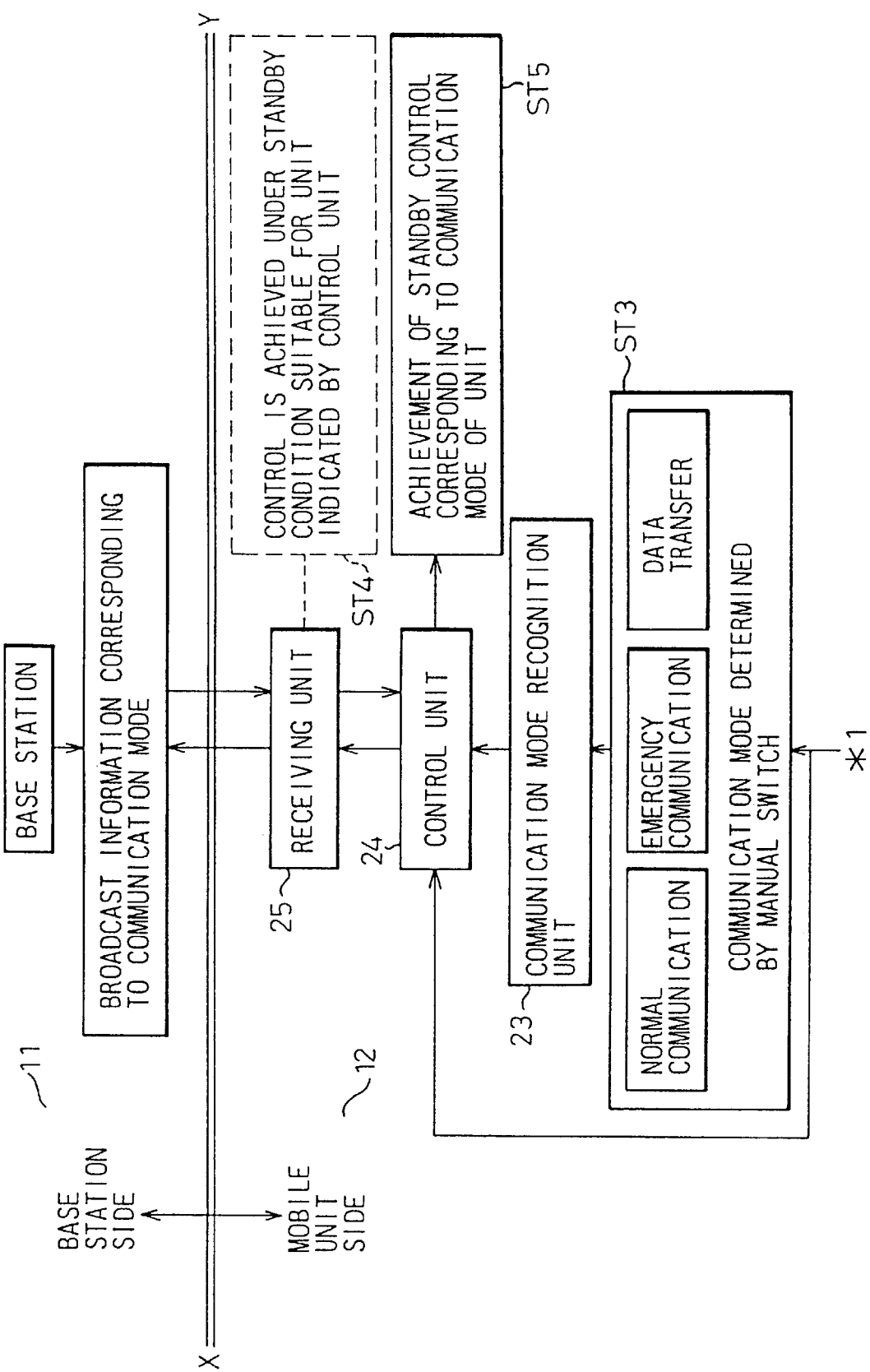

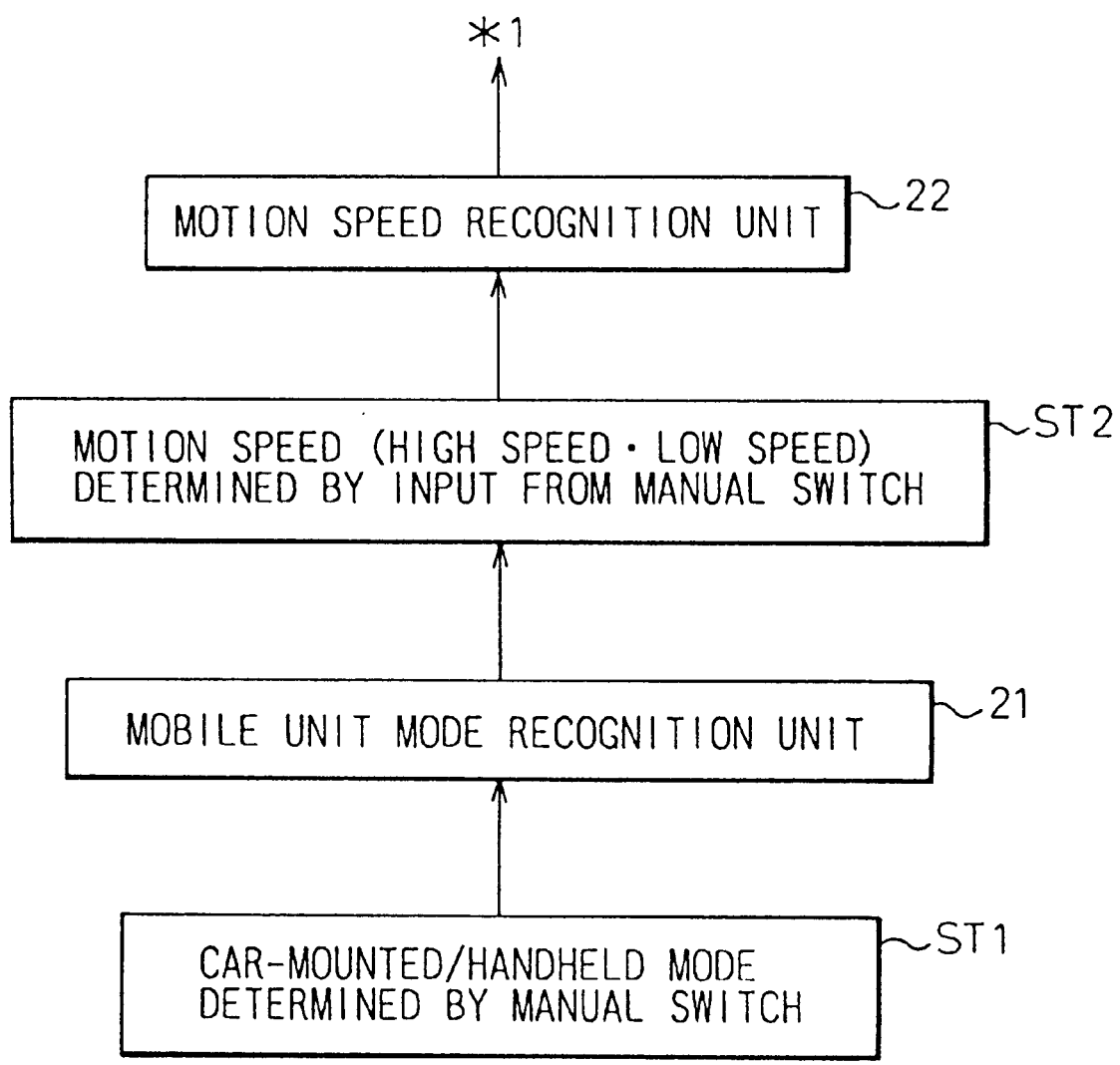

Fig. 4

| *1 | *2 |
|---|---|
| TYPE OF MESSAGES | |
| NETWORK NUMBER | |
| REGULATION INFORMATION | |
| CONTROL CHANNEL CONFIGURATION INFORMATION | |
| SPECIFICATION OF TRANSMISSION POWER FROM MOBILE UNIT | |
| CAR-MOUNTED UNIT STANDBY ENABLING LEVEL | NORMAL COMMUNICATION STANDBY ENABLING LEVEL |
| | EMERGENCY COMMUNICATION STANDBY ENABLING LEVEL |
| | DATA TRANSFER STANDBY ENABLING LEVEL |
| CAR-MOUNTED UNIT STANDBY DISABLING LEVEL | NORMAL COMMUNICATION STANDBY DISABLING LEVEL |
| | EMERGENCY COMMUNICATION STANDBY DISABLING LEVEL |
| | DATA TRANSFER STANDBY DISABLING LEVEL |
| HANDHELD UNIT STANDBY ENABLING LEVEL | NORMAL COMMUNICATION STANDBY ENABLING LEVEL |
| | EMERGENCY COMMUNICATION STANDBY ENABLING LEVEL |
| | DATA TRANSFER STANDBY ENABLING LEVEL |
| HANDHELD UNIT STANDBY DISABLING LEVEL | NORMAL COMMUNICATION STANDBY DISABLING LEVEL |
| | EMERGENCY COMMUNICATION STANDBY DISABLING LEVEL |
| | DATA TRANSFER STANDBY DISABLING LEVEL |
| NUMBER OF MULTIPLICITY OF LOCATION REGISTRATION AREAS | |

Fig. 6

| Field | Value |
|---|---|
| TYPE OF MESSAGES | |
| NETWORK NUMBER | |
| REGULATION INFORMATION | |
| CONTROL CHANNEL CONFIGURATION INFORMATION | |
| SPECIFICATION OF TRANSMISSION POWER FROM MOBILE UNIT | |
| HIGH SPEED MOTION CAR-MOUNTED UNIT STANDBY ENABLING LEVEL | NORMAL COMMUNICATION STANDBY ENABLING LEVEL |
| | EMERGENCY COMMUNICATION STANDBY ENABLING LEVEL |
| | DATA TRANSFER STANDBY ENABLING LEVEL |
| LOW SPEED MOTION CAR-MOUNTED UNIT STANDBY ENABLING LEVEL | NORMAL COMMUNICATION STANDBY ENABLING LEVEL |
| | EMERGENCY COMMUNICATION STANDBY ENABLING LEVEL |
| | DATA TRANSFER STANDBY ENABLING LEVEL |
| HIGH SPEED MOTION CAR-MOUNTED UNIT STANDBY DISABLING LEVEL | NORMAL COMMUNICATION STANDBY DISABLING LEVEL |
| | EMERGENCY COMMUNICATION STANDBY DISABLING LEVEL |
| | DATA TRANSFER STANDBY DISABLING LEVEL |
| LOW SPEED MOTION CAR-MOUNTED UNIT STANDBY DISABLING LEVEL | NORMAL COMMUNICATION STANDBY DISABLING LEVEL |
| | EMERGENCY COMMUNICATION STANDBY DISABLING LEVEL |
| | DATA TRANSFER STANDBY DISABLING LEVEL |
| HIGH SPEED MOTION HANDHELD UNIT STANDBY ENABLING LEVEL | NORMAL COMMUNICATION STANDBY ENABLING LEVEL |
| | EMERGENCY COMMUNICATION STANDBY ENABLING LEVEL |
| | DATA TRANSFER STANDBY ENABLING LEVEL |

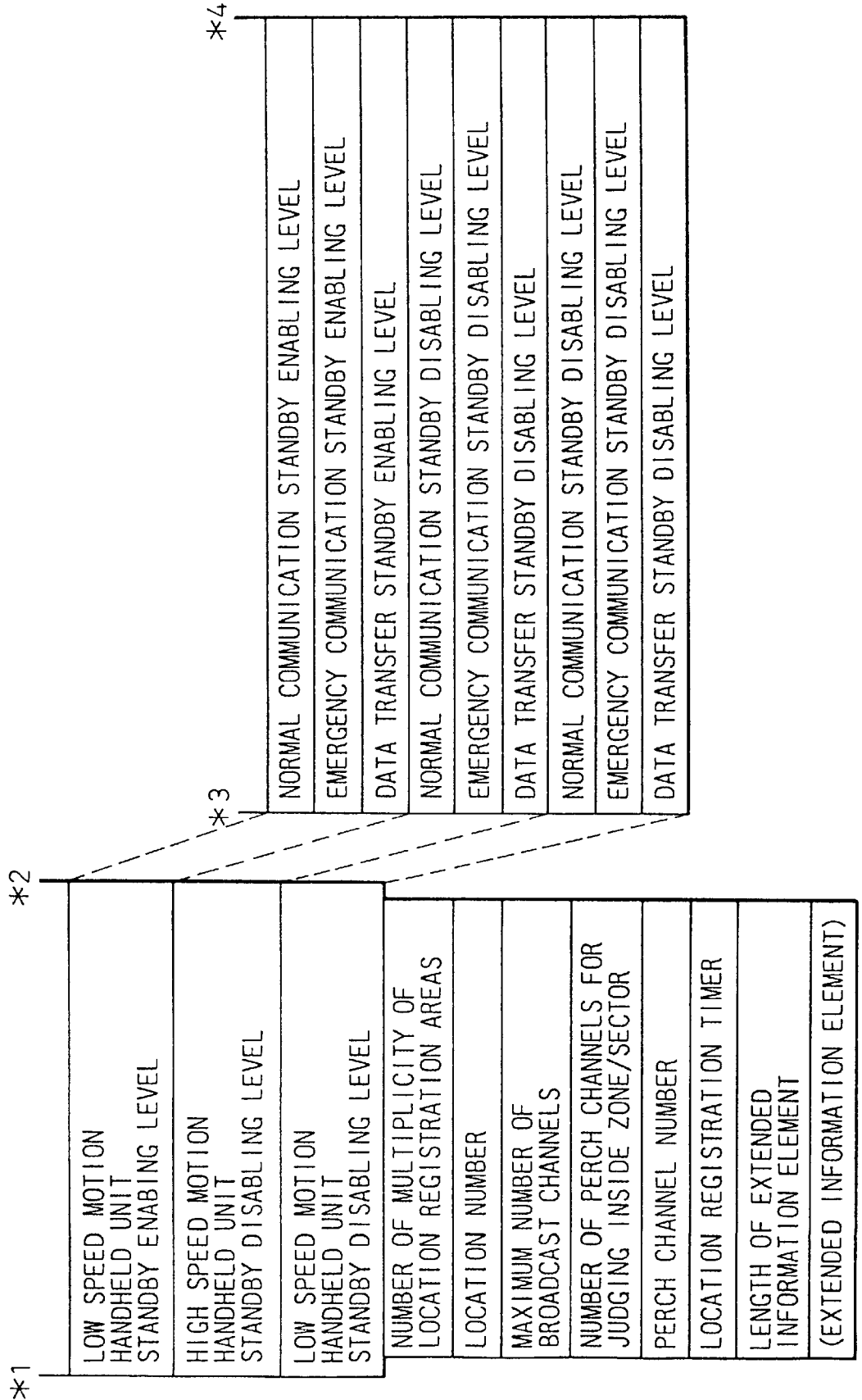

Fig. 8

| TYPE OF MESSAGES |
|---|
| NETWORK NUMBER |
| REGULATION INFORMATION |
| CONTROL CHANNEL CONFIGURATION INFORMATION |
| SPECIFICATION OF TRANSMISSION POWER FROM MOBILE UNIT |
| CAR-MOUNTED UNIT STANDBY ENABLING LEVEL |
| CAR-MOUNTED UNIT STANDBY DISABLING LEVEL |
| HANDHELD UNIT STANDBY ENABLING LEVEL |
| HANDHELD UNIT STANDBY DISABLING LEVEL |

| |
|---|
| HIGH SPEED MOTION-NORMAL COMMUNICATION STANDBY ENABLING LEVEL |
| HIGH SPEED MOTION-EMERGENCY COMMUNICATION STANDBY ENABLING LEVEL |
| HIGH SPEED MOTION-DATA TRANSFER STANDBY ENABLING LEVEL |
| LOW SPEED MOTION-NORMAL COMMUNICATION STANDBY ENABLING LEVEL |
| LOW SPEED MOTION-EMERGENCY COMMUNICATION STANDBY ENABLING LEVEL |
| LOW SPEED MOTION-DATA TRANSFER STANDBY ENABLING LEVEL |
| HIGH SPEED MOTION-NORMAL COMMUNICATION STANDBY DISABLING LEVEL |
| HIGH SPEED MOTION-EMERGENCY COMMUNICATION STANDBY DISABLING LEVEL |
| HIGH SPEED MOTION-DATA TRANSFER STANDBY DISABLING LEVEL |
| LOW SPEED MOTION-NORMAL COMMUNICATION STANDBY DISABLING LEVEL |
| LOW SPEED MOTION-EMERGENCY COMMUNICATION STANDBY DISABLING LEVEL |
| LOW SPEED MOTION-DATA TRANSFER STANDBY DISABLING LEVEL |

Fig.9

*1
- NUMBER OF MULTIPLICITY OF LOCATION REGISTRATION AREAS
- LOCATION NUMBER
- MAXIMUM NUMBER OF BROADCAST CHANNELS
- NUMBER OF PERCH CHANNELS FOR JUDGING INSIDE ZONE/SECTOR
- PERCH CHANNEL NUMBER
- LOCATION REGISTRATION TIMER
- LENGTH OF EXTENDED INFORMATION ELEMENT
- (EXTENDED INFORMATION ELEMENT) *2

*3
- HIGH SPEED MOTION-NORMAL COMMUNICATION STANDBY ENABLING LEVEL
- HIGH SPEED MOTION-EMERGENCY COMMUNICATION STANDBY ENABLING LEVEL
- HIGH SPEED MOTION-DATA TRANSFER STANDBY ENABLING LEVEL
- LOW SPEED MOTION-NORMAL COMMUNICATION STANDBY ENABLING LEVEL
- LOW SPEED MOTION-EMERGENCY COMMUNICATION STANDBY ENABLING LEVEL
- LOW SPEED MOTION-DATA TRANSFER STANDBY ENABLING LEVEL
- HIGH SPEED MOTION-NORMAL COMMUNICATION STANDBY DISABLING LEVEL
- HIGH SPEED MOTION-EMERGENCY COMMUNICATION STANDBY DISABLING LEVEL
- HIGH SPEED MOTION-DATA TRANSFER STANDBY DISABLING LEVEL
- LOW SPEED MOTION-NORMAL COMMUNICATION STANDBY DISABLING LEVEL
- LOW SPEED MOTION-EMERGENCY COMMUNICATION STANDBY DISABLING LEVEL
- LOW SPEED MOTION-DATA TRANSFER STANDBY DISABLING LEVEL *4

Fig. 10

| | |
|---|---|
| NORMAL COMMUNICATION STANDBY ENABLING LEVEL | 17 (dBμ) |
| EMERGENCY COMMUNICATION STANDBY ENABLING LEVEL | 7 (dBμ) |
| DATA TRANSFER STANDBY ENABLING LEVEL | 25 (dBμ) |
| NORMAL COMMUNICATION STANDBY DISABLING LEVEL | 14 (dBμ) |
| EMERGENCY COMMUNICATION STANDBY DISABLING LEVEL | 4 (dBμ) |
| DATA TRANSFER STANDBY DISABLING LEVEL | 22 (dBμ) |
| NORMAL COMMUNICATION STANDBY ENABLING LEVEL | |
| EMERGENCY COMMUNICATION STANDBY ENABLING LEVEL | |
| DATA TRANSFER STANDBY ENABLING LEVEL | |
| NORMAL COMMUNICATION STANDBY DISABLING LEVEL | |
| EMERGENCY COMMUNICATION STANDBY DISABLING LEVEL | |
| DATA TRANSFER STANDBY DISABLING LEVEL | |

Fig. 11

| | |
|---|---|
| NORMAL COMMUNICATION STANDBY ENABLING LEVEL | REFERENCE VALUE 17(dBμ) |
| EMERGENCY COMMUNICATION STANDBY ENABLING LEVEL | RELATIVE VALUE RELATIVE TO REFERENCE VALUE −10(dB) |
| DATA TRANSFER STANDBY ENABLING LEVEL | RELATIVE VALUE RELATIVE TO REFERENCE VALUE +8(dB) |
| NORMAL COMMUNICATION STANDBY DISABLING LEVEL | REFERENCE VALUE 14(dBμ) |
| EMERGENCY COMMUNICATION STANDBY DISABLING LEVEL | RELATIVE VALUE RELATIVE TO REFERENCE VALUE −10(dB) |
| DATA TRANSFER STANDBY DISABLING LEVEL | RELATIVE VALUE RELATIVE TO REFERENCE VALUE +8(dB) |
| NORMAL COMMUNICATION STANDBY ENABLING LEVEL | |
| EMERGENCY COMMUNICATION STANDBY ENABLING LEVEL | |
| DATA TRANSFER STANDBY ENABLING LEVEL | |
| NORMAL COMMUNICATION STANDBY DISABLING LEVEL | |
| EMERGENCY COMMUNICATION STANDBY DISABLING LEVEL | |
| DATA TRANSFER STANDBY DISABLING LEVEL | |

Fig. 12

| | |
|---|---|
| NORMAL COMMUNICATION STANDBY ENABLING ERROR RATE | BER = $10^{-3}$ |
| EMERGENCY COMMUNICATION STANDBY ENABLING ERROR RATE | BER = $5 \times 10^{-2}$ |
| DATA TRANSFER STANDBY ENABLING ERROR RATE | BER = $10^{-4}$ |
| NORMAL COMMUNICATION STANDBY DISABLING ERROR RATE | BER = $10^{-2}$ |
| EMERGENCY COMMUNICATION STANDBY DISABLING ERROR RATE | BER = $7 \times 10^{-2}$ |
| DATA TRANSFER STANDBY DISABLING ERROR RATE | BER = $10^{-3}$ |
| NORMAL COMMUNICATION STANDBY ENABLING ERROR RATE | |
| EMERGENCY COMMUNICATION STANDBY ENABLING ERROR RATE | |
| DATA TRANSFER STANDBY ENABLING ERROR RATE | |
| NORMAL COMMUNICATION STANDBY DISABLING ERROR RATE | |
| EMERGENCY COMMUNICATION STANDBY DISABLING ERROR RATE | |
| DATA TRANSFER STANDBY DISABLING ERROR RATE | |

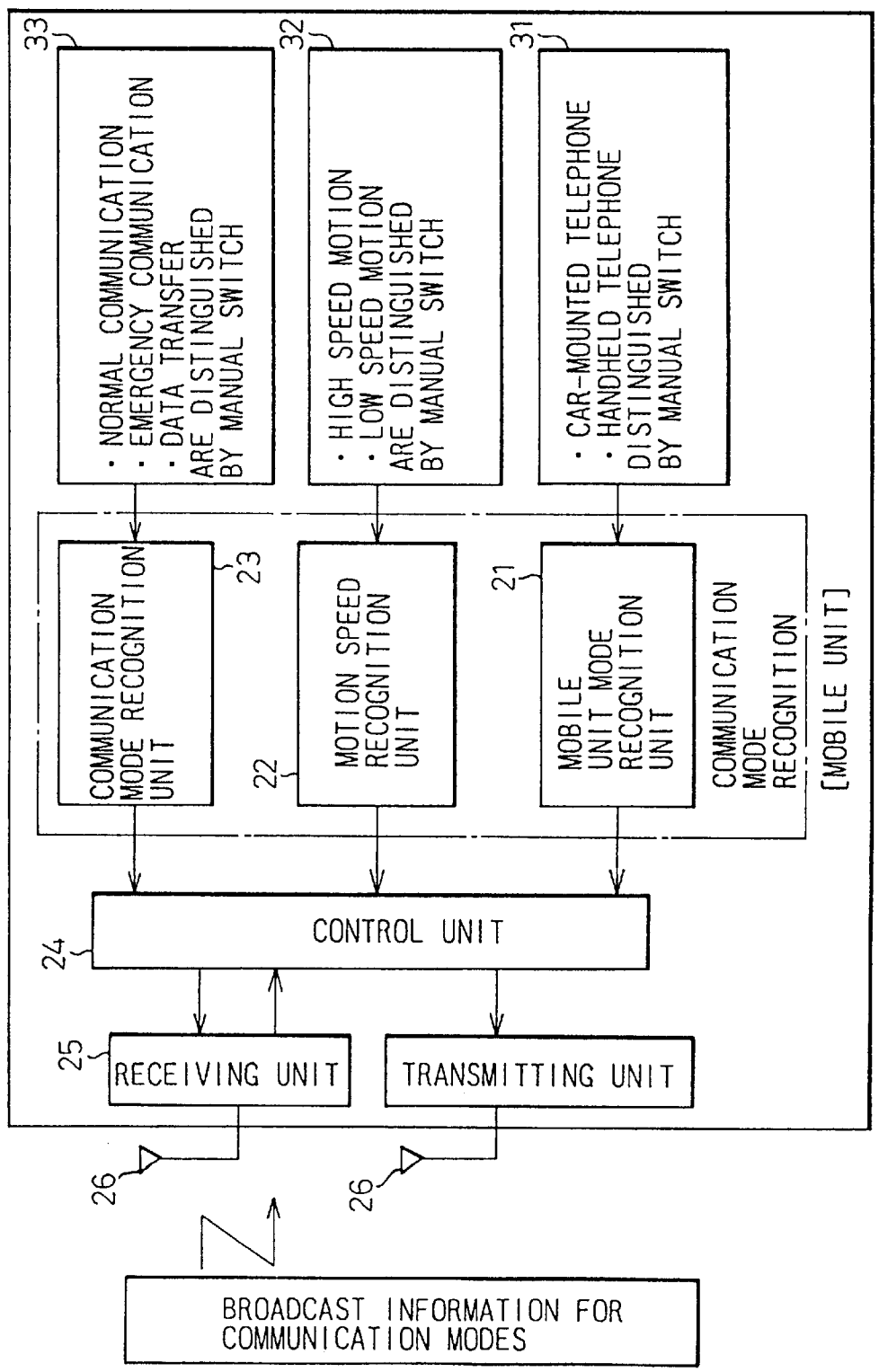

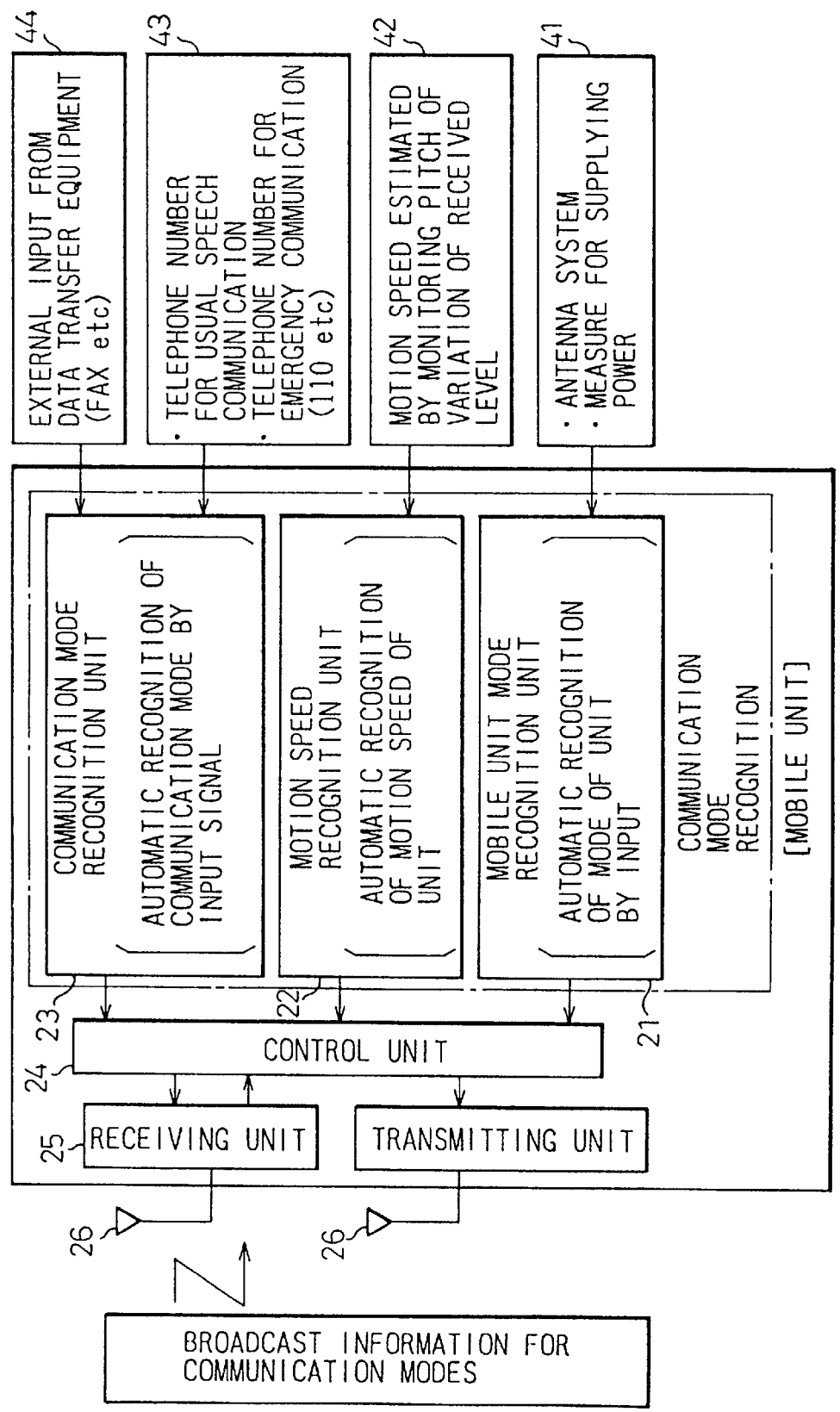

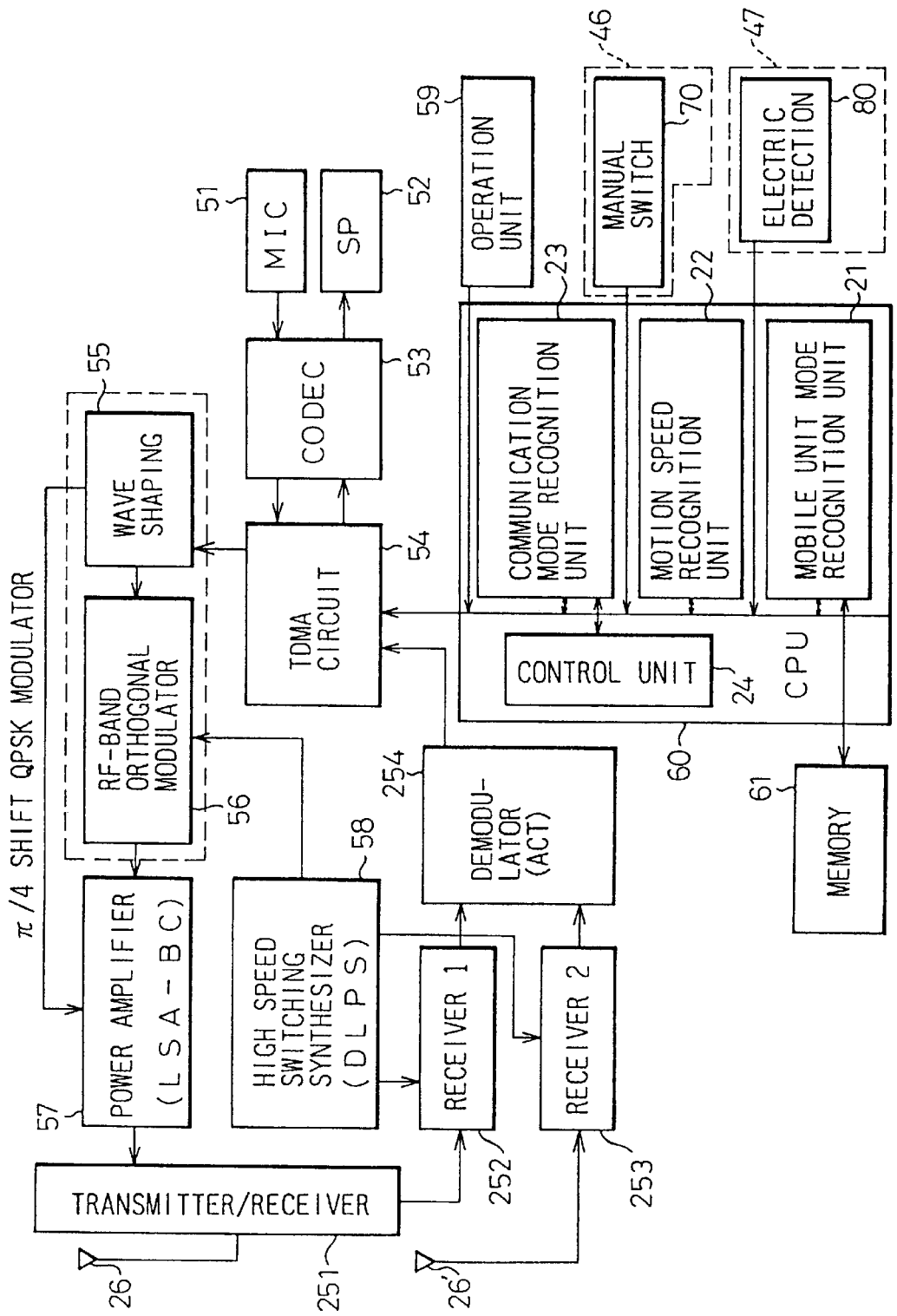

Fig. 32

| *1 | *2 |
|---|---|
| | TYPE OF MESSAGES |
| | NETWORK NUMBER |
| | REGULATION INFORMATION |
| | CONTROL CHANNEL CONFIGURATION INFORMATION |
| | SPECIFICATION OF TRANSMISSION POWER FROM MOBILE UNIT |
| 1 | HIGH SPEED MOTION CAR-MOUNTED UNIT STANDBY ENABLING LEVEL |
| | HIGH SPEED MOTION CAR-MOUNTED UNIT STANDBY DISABLING LEVEL |
| 2 | LOW SPEED MOTION CAR-MOUNTED UNIT STANDBY ENABLING LEVEL |
| | LOW SPEED MOTION CAR-MOUNTED UNIT STANDBY DISABLING LEVEL |

| *4 | *5 | *6 |
|---|---|---|
| | 1 | NORMAL COMMUNICATION STANDBY ENABLING LEVEL |
| | | NORMAL COMMUNICATION STANDBY DISABLING LEVEL |
| | 2 | EMERGENCY COMMUNICATION STANDBY ENABLING LEVEL |
| | | EMERGENCY COMMUNICATION STANDBY DISABLING LEVEL |
| | 3 | DATA TRANSFER STANDBY ENABLING LEVEL |
| | | DATA TRANSFER STANDBY DISABLING LEVEL |
| | 1 | NORMAL COMMUNICATION STANDBY ENABLING LEVEL |
| | | NORMAL COMMUNICATION STANDBY DISABLING LEVEL |
| | 2 | EMERGENCY COMMUNICATION STANDBY ENABLING LEVEL |
| | | EMERGENCY COMMUNICATION STANDBY DISABLING LEVEL |
| | 3 | DATA TRANSFER STANDBY ENABLING LEVEL |
| | | DATA TRANSFER STANDBY DISABLING LEVEL |

Fig. 33

| *1 | *2 | *3 | *4 | *5 | *6 |
|---|---|---|---|---|---|
| 3 | HIGH SPEED MOTION HANDHELD UNIT STANDBY ENABLING LEVEL | | | | |
| | HIGH SPEED MOTION HANDHELD UNIT STANDBY DISABLING LEVEL | | | | |
| 4 | LOW SPEED MOTION HANDHELD UNIT STANDBY ENABLING LEVEL | | | | |
| | LOW SPEED MOTION HANDHELD UNIT STANDBY DISABLING LEVEL | | | | |
| | NUMBER OF MULTIPLICITY OF LOCATION REGISTRATION AREAS | | 1 | NORMAL COMMUNICATION STANDBY ENABLING LEVEL | |
| | LOCATION NUMBER | | | NORMAL COMMUNICATION STANDBY DISABLING LEVEL | |
| | MAXIMUM NUMBER OF BROADCAST CHANNELS | | 2 | EMERGENCY COMMUNICATION STANDBY ENABLING LEVEL | |
| | NUMBER OF PERCH CHANNELS FOR JUDGING INSIDE ZONE/SECTOR | | | EMERGENCY COMMUNICATION STANDBY DISABLING LEVEL | |
| | PERCH CHANNEL NUMBER | | 3 | DATA TRANSFER STANDBY ENABLING LEVEL | |
| | LOCATION REGISTRATION TIMER | | | DATA TRANSFER STANDBY DISABLING LEVEL | |
| | LENGTH OF EXTENDED INFORMATION ELEMENT | | 1 | NORMAL COMMUNICATION STANDBY ENABLING LEVEL | |
| | (EXTENDED INFORMATION ELEMENT) | | | NORMAL COMMUNICATION STANDBY DISABLING LEVEL | |
| | | | 2 | EMERGENCY COMMUNICATION STANDBY ENABLING LEVEL | |
| | | | | EMERGENCY COMMUNICATION STANDBY DISABLING LEVEL | |
| | | | 3 | DATA TRANSFER STANDBY ENABLING LEVEL | |
| | | | | DATA TRANSFER STANDBY DISABLING LEVEL | |

Fig.35

BROADCAST INFORMATION

| TYPE OF MESSAGES |
| --- |
| NETWORK NUMBER |
| REGULATION INFORMATION |
| CONTROL CHANNEL CONFIGURATION INFORMATION |
| SPECIFICATION OF TRANSMISSION POWER FROM MOBILE UNIT |
| STANDBY ENABLING CONDITION |
| STANDBY DISABLING CONDITION |
| NUMBER OF MULTIPLICITY OF LOCATION REGISTRATION AREAS |
| LOCATION NUMBER |
| MAXIMUM NUMBER OF BROADCAST CHANNELS |
| NUMBER OF PERCH CHANNELS FOR JUDGING INSIDE ZONE/SECTOR |
| PERCH CHANNEL NUMBER |
| LOCATION REGISTRATION TIMER |
| LENGTH OF EXTENDED INFORMATION ELEMENT |
| (EXTENDED INFORMATION ELEMENT) |

A { STANDBY ENABLING CONDITION, STANDBY DISABLING CONDITION }

METHOD FOR STANDBY CONTROL IN A MOBILE TELECOMMUNICATIONS NETWORK SETTING STANDBY CONDITIONS CONFORMING TO DIFFERENT MODES OF COMMUNICATION AND MOBILE UNIT USING SAME

BACKGROUND OF THE INVENTION

1. Field of the Invention

The present invention relates to a method for standby control in a mobile telecommunication network, more particularly to a method for standby control in a base station and mobile unit in a mobile telecommunication network and to a mobile unit using the same.

Control information transmitted between a base station and a mobile unit is sent via a specially provided common radio control channel or is sent via an individual radio speech channel assigned to each mobile unit. The present invention relates to the former radio control channel.

There are various types of information which are sent over the radio control channel, but the present invention is concerned in particular with the broadcast information sent from the base station side to the mobile units in a standby state.

2. Description of the Related Art

In a mobile telecommunication network, a base station covers a certain service zone using a carrier (electric wave) having a frequency assigned to that base station. A mobile unit moving in the zone communicates with another party through the base station.

The base station broadcasts information to all the mobile units in the standby state in its zone. The mobile units execute certain control processes based on the received broadcast information to engage in calls.

The broadcast information is sent from the base station periodically via the previously mentioned common radio control channel.

The portions of the broadcast information particularly relevant to the present invention are the "standby enabling condition" and the "standby disabling condition". A typical "standby enabling condition" is the standby enabling level. When above that level, a mobile unit can start a call.

On the other hand, a typical "standby disabling condition" is the standby disabling level. If less than this level, the mobile unit cannot start a call. Further, the "standby disabling level" has another meaning. That is, it means the level at which a normal call quality can no longer be guaranteed when a mobile unit engaged in a call begins to leave a zone. In this case, "outside zone" is shown on the display of the mobile unit.

As explained above, a mobile unit is able to originate or receive a call when the level of reception is higher than a specific standby enabling level. On the other hand, it is inhibited from originating or receiving a call whenever the level is less than the specific standby disabling level.

Even if engaged in a call, the "outside zone" indication is given when the level falls below the standby disabling level.

The recent advances being made in mobile telecommunication networks have led to a tremendous rise in the number of users. Along with this, various modes of communication other than normal speech have been started.

The modes of communication differ depending on the differences in the types of the mobile units as well. Compared to communication using a car-mounted unit, communication using a handheld unit features much worse communication conditions, such as a far greater loss. Further, the modes of communication differ depending on whether the car-mounted unit or a car carrying a handheld unit is moving fast or slow. The following problem results from these differences in the modes of communication.

When setting a single standby enabling level so as to ensure the quality to be satisfied in normal speech as in the past, the "outside zone" display is given when the quality of communication for normal speech cannot be met. It therefore no longer becomes possible to make a call even when an emergency situation arises despite the urgent need to make the call. Considered from the opposite viewpoint, if a single standby enabling level is set considering only emergency situations, then while calls can be made in emergencies, the quality of communication would become extremely poor for a mobile unit at the fringes of a service area at the time of a normal calls.

Also, if a single standby enabling level is set to the quality to be satisfied in a normal speech call, when used for transferring data, where a higher quality is sought than normal speech calls, errors will be caused even in locations good enough for normal speech calls.

Considering this from the opposite viewpoint, if a single standby enabling level is set considering only data transfer, then there will be the trouble of a call not being possible due to the standby enabling level not being met despite a level of reception sufficient for speech calls from the standpoint of the mobile unit.

This means that in the case of an emergency such as a traffic accident, a mobile unit located at a position somewhat away from the zone would not be able to notify the authorities of the emergency. This means the failure of the basic function of a telecommunication network.

SUMMARY OF THE INVENTION

Accordingly, in consideration of the above problems, the present invention has as its object the provision of a method of standby control in a base station and a mobile unit which enables the standby state to be set flexibly in accordance with the various modes of communication of a mobile unit and to a mobile unit using the same.

To attain the above object, there is provided a method for standby control in a base station and a mobile unit, wherein the base station broadcasts information including standby control information having a plurality of types of standby conditions conforming to different modes of communication of the mobile units as standby conditions for the mobile units and wherein the mobile units recognize which of the several modes of communication they are in, extract from the broadcast information the standby condition corresponding to the recognized mode of communication, and execute standby control under the extracted standby condition, thereby enabling standby control under communication conditions conforming to the mode of communication the mobile units are in.

BRIEF DESCRIPTION OF THE DRAWINGS

The above object and features of the present invention will be more apparent from the following description of the preferred embodiments with reference to the accompanying drawings, wherein:

FIG. 2 is a view (part 1) of an embodiment realizing the principle of FIG. 1;

FIG. 3 is a view (part 2) of an embodiment realizing the principle of FIG. 1;

FIG. 4 is a view of the signal format (part 1) showing a first example of broadcast information according to the present invention;

FIG. 6 is a view of the signal format (part 1) showing a second example of broadcast information according to the present invention;

FIG. 7 is a view of the signal format (part 2) showing a second example of broadcast information according to the present invention;

FIG. 8 is a view of the signal format (part 1) showing a third example of broadcast information according to the present invention;

FIG. 9 is a view of the signal format (part 2) showing a third example of broadcast information according to the present invention;

FIG. 10 is a view of a first example of the method of expressing the standby level of reception;

FIG. 11 is a view of a second example of the method of expressing the standby level of reception;

FIG. 12 is a view of a third example of the method of expressing the standby level of reception;

FIG. 13 is a view illustrating an example of the configuration of a mobile unit (manual type);

FIG. 14 is a view illustrating an example of the configuration of a mobile unit (automatic type);

FIG. 15 is a view of the state of assembly of the central processing unit (CPU) and peripheral portions related to the present invention in a known example of the configuration of a mobile unit;

FIG. 22 is a flow chart (part 1) of the operation by which a mobile unit shifts to a standby state at the time power is turned on;

FIG. 23 is a flow chart (part 2) of the operation by which a mobile unit shifts to a standby state at the time power is turned on;

FIG. 32 is a view of the signal format (part 1) showing a fourth example of broadcast information according to the present invention;

FIG. 33 is a view of the signal format (part 2) showing a fourth example of broadcast information according to the present invention;

FIG. 35 is a view of an example of general broadcast information.

DESCRIPTION OF THE PREFERRED EMBODIMENTS

Before describing the embodiments of the present invention, the related art and the disadvantages therein will be described with reference to the related figures.

Figure 34:
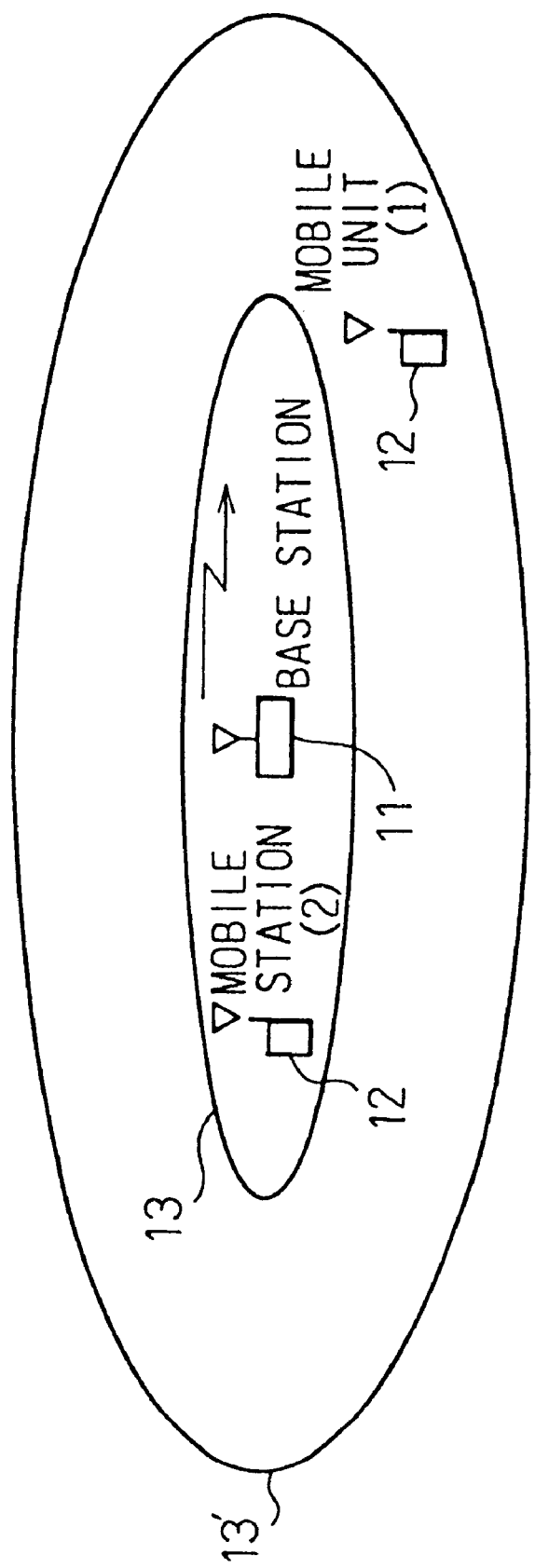
FIG. 34 is a view of the general configuration of a mobile telecommunication network.

FIG. 34 is a view of the general configuration of a mobile telecommunication network. In the figure, 11 is a base station which covers a certain service zone 13 by a carrier (electric wave) having a frequency assigned to that base station. A mobile unit 12 (2) moving in the zone 13 communicates with another party through the base station 11.

Broadcast information is sent from the base station 11 to the mobile units 12 in the standby state. The mobile units 12 execute control processes based on the received broadcast information to engage in a call.

FIG. 35 is a view of an example of general broadcast information. The broadcast information of the figure is sent from the base station 11 to all mobile units 12 in its service zone 13 periodically, for example, every 2 seconds, by a predetermined signal format via the previously mentioned common radio control channel.

The portion of the broadcast information shown in FIG. 35 particularly relevant to the present invention is the portion A in the figure, i.e., the "standby enabling condition" and the "standby disabling condition". A typical "standby enabling condition" is the standby enabling level. This is the level of the received field strength of the carriers which can currently be received by a mobile unit enabling origination or reception of a call. That is, if the level is above this, a mobile unit 12 can start a call.

On the other hand, a typical "standby disabling condition" is the standby disabling level. This is the level of the received field strength of carriers which can currently be received by a mobile unit 12 inhibiting origination or reception of a call. That is, if the level is less than this, the mobile unit 12 cannot start a call. Further, the "standby disabling level" has another meaning. That is, it means the level at which a normal call quality can no longer be guaranteed when a mobile unit 12 engaged in a call begins to leave a zone. In this case, "outside zone" is shown on the display of the mobile unit. Note that this "outside zone" includes not only cases where the mobile unit is actually out of a zone, but also when it is in the zone, but positioned in the shadow of a building or in a long tunnel.

As explained above, a mobile unit is able to originate or receive a call when the level of reception is higher than a specific standby enabling level. On the other hand, it is inhibited from originating or receiving a call whenever the level is less than the specific standby disabling level.

Even if engaged in a call, the "out of zone" indication is given when the level falls below the standby disabling level.

The recent advances being made in mobile telecommunication networks have led to a tremendous rise in the number of users. Along with this, various modes of communication other than normal speech have been started. For example, mention may be made of the transmission and reception of facsimile data and computer data. Also, there is use for notification of emergencies in the event of natural disasters or traffic accidents.

The modes of communication differ depending on the differences in the types of the mobile units as well. For example, it is possible to communicate from a car-mounted unit, communicate from a handheld unit, or communicate from a dual car-mounted/handheld unit by using one of the two selectively. Compared to communication using a car-mounted unit, communication using a handheld unit features much worse communication conditions, such as a far greater loss. Further, the modes of communication differ depending on whether the car-mounted unit or a car carrying a handheld unit is moving fast or slow.

More specifically, when setting a single standby enabling level so as to ensure a quality to be satisfied in normal speech as in the past, the "outside zone" display is given when the quality of communication for normal speech cannot be met. It therefore no longer becomes possible to communicate even when an emergency situation arises despite the urgent need to make the call. Considered from the opposite viewpoint, if a single standby enabling level is set considering only emergency situations, then while calls can be made in emergencies, the quality of communication would become extremely poor for a mobile unit at the fringe of a service area at the time of normal calls.

Taking another example, if a single standby enabling level is set to the quality to be satisfied in a normal speech call, when used for transferring data, where a higher quality is sought than normal speech calls, errors will be caused even in locations good enough for normal speech calls.

Considering this from the opposite viewpoint, if a single standby enabling level is set considering only data transfer, then there will be the trouble of a call not being possible due to the standby enabling level not being met despite a level of reception sufficient for speech calls from the standpoint of the mobile unit.

This means that in the case of an emergency such as a traffic accident, a mobile unit (1) 12 located at a zone 13' (with a standby enabling level of 7 dB μ) somewhat away from the zone 13 in FIG. 34 (with a standby enabling level of 17 dB μ) would not be able to notify the authorities of the emergency. This means the failure of the basic function of a telecommunication network.

Accordingly, the present invention provides a method of standby control in a base station and a mobile unit which enables the standby state to be set flexibly in accordance with the various modes of communication of a mobile unit and to a mobile unit using the same.

Figure 1:
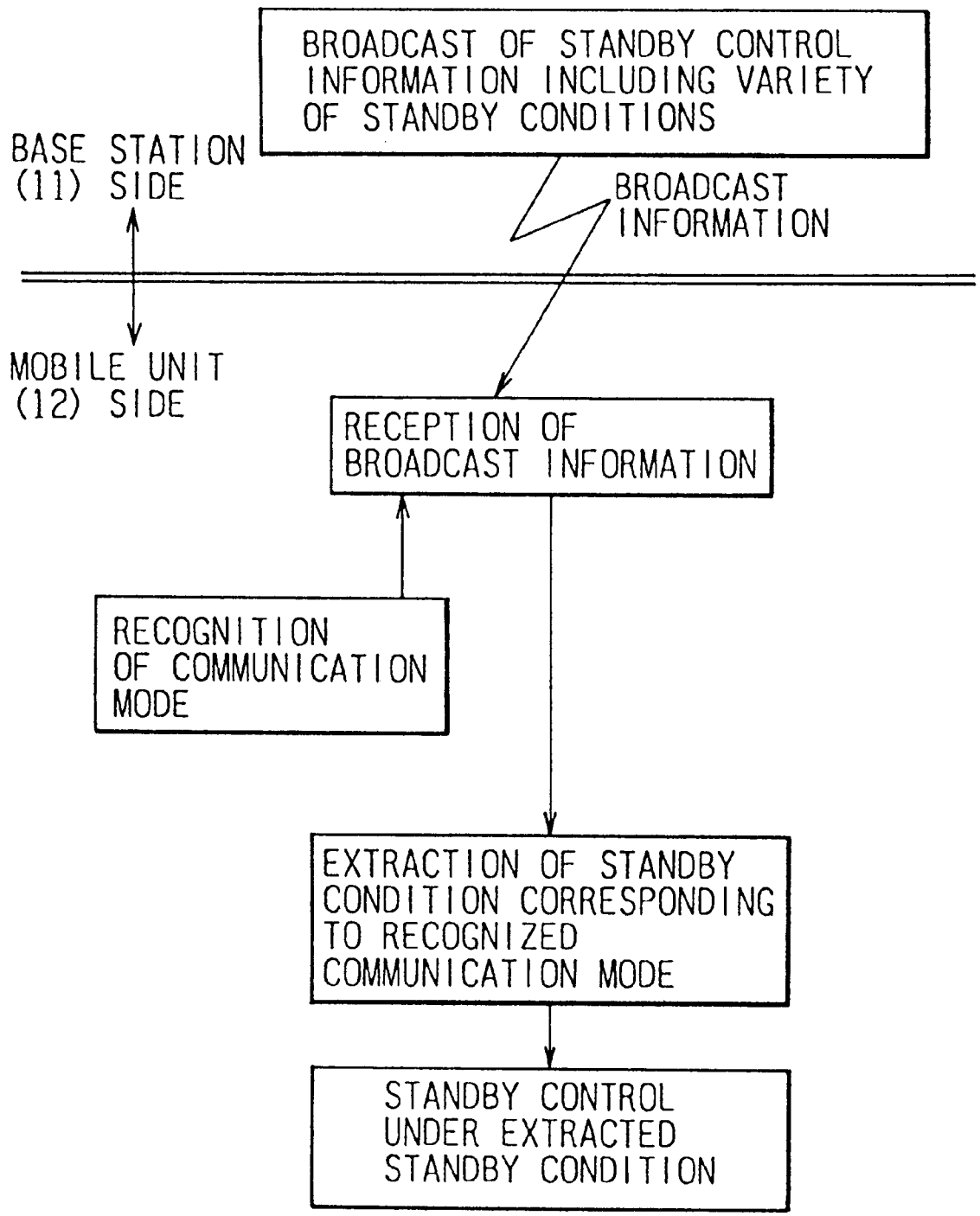
FIG. 1 is a view of the principle of standby control in a base station and mobile unit according to the present invention.

FIG. 1 is a view of the principle of standby control in a base station and mobile unit according to the present invention.

In FIG. 1, the base station 11 broadcasts information including standby control information comprised of several types of standby conditions conforming to different modes of communication of the mobile units 12 as standby conditions for the mobile units 12.

The mobile units 12 recognize which of the several modes of communication they are in, extract from the broadcast information the standby condition corresponding to the recognized mode of communication, and execute standby control under the extracted standby condition.

Since control parameters for the standby control performed between a base station and mobile unit are set individually for each of a plurality of modes of communication, even in a state of call which cannot be maintained under the normal communication mode, the call is possible under the emergency communication mode.

The standby conditions sent by the base station 11 are determined by at least one of a) the standby level of reception and b) the predetermined bit error rate. Various values are set for the normal standby level of reception and bit error rate (in the past fixed to a single standard value).

As the standby level of reception, use is made of the standby enabling level and the standby disabling level. This takes note of the fact that the most often used levels of reception are the standby enabling level and standby disabling level. These are divided further to various levels.

The standby level of reception, further, may include at least one of the normal communication standby level of reception, emergency communication standby level of reception, and data transfer standby level of reception. Here, the various standby levels of reception are indicated by the standby enabling level and the standby disabling level. The enabling (disabling) reception levels are set lower in that order.

When the mobile unit 12 is a dual carmounted/handheld unit, a car-mounted unit standby level of reception and a handheld unit standby level of reception may be used as the standby levels of reception. In this case, further, use may be made of a high speed motion car-mounted unit standby level of reception and a low speed motion car-mounted unit standby level of reception and a high speed motion handheld unit standby level of reception and a speed motion handheld unit standby level of reception. This is related to the fact that sensitivity of reception is better in the car-mounted mode than the handheld mode.

Preferably, the various levels of reception may be indicated by absolute values. For example, the standby level of reception may be indicated by an absolute value.

Alternatively, the various levels of reception may be indicated based on the value of the level of reception under one mode of communication, with the levels of reception under the other modes of communication made relative values of the same. For example, when the standby level of reception includes a normal communication standby level of reception, an emergency communication standby level of reception, and a data transfer standby level of reception, the emergency communication standby level of reception and the data transfer standby level of reception may be indicated by relative values based on the value of the normal communication standby level of reception as a reference value.

Looking at the mobile unit 12, the different modes of communication may be determined manually, i.e., the mobile unit 12 may recognize in which mode of the plurality of modes of communication it is, in accordance with the state of connection of a manual switch. In this case, the mobile unit may recognize if it is in the normal communication mode, emergency communication mode, or data transfer mode in accordance with the state of connection of a first manual switch; may recognizes if it is in a high speed motion communication mode or a low speed motion communication mode in accordance with the state of connection of a second manual switch; and may recognizes if it is in a car-mounted unit communication mode or a handheld unit communication mode in accordance with the state of connection of a third manual switch.

Alternatively, the mode of communication may be determined automatically, i.e., the mobile unit 12 may automatically recognize which mode of the plurality of modes of communication it is in by electric detection means. In this case, the mobile unit may automatically recognize if it is in the normal communication mode, emergency communication mode, or data transfer mode in accordance with a first electric detection means; may monitor the telephone number to automatically recognize if it is in a normal communication mode or an emergency communication mode in accordance with a second electric detection means; may monitor the pitch of variation of the level of reception of the signal from the base station 11 and estimate the speed of motion of the mobile unit 12 so as to automatically recognize if it is in a high speed motion communication mode or a low speed motion communication mode by a third electric detection means; may monitor if it is connected to a car-mounted unit side antenna or a handheld unit side antenna to automatically recognize if it is in the car-mounted unit communication mode or the handheld unit communication mode by a fourth electric detection means; and may monitor if it is connected to a car-mounted unit side power source or a handheld unit side power source to automatically recognize if it is in the car-mounted unit communication mode or the handheld unit communication mode by a fifth electric detection means.

Preferably, the mobile unit 12 is provided with a manual switch for the operator to set which of a plurality of modes of communication it is to be in or provided with an electric detection means for enabling the mobile unit to automatically recognize which of a plurality of modes of communication it is in. That is, the mobile unit is provided with hardware for recognition of the modes of communication.

FIG. 2 and FIG. 3 are views (parts 1 and 2) of an embodiment realizing the principle of FIG. 1.

The top half of FIG. 2 above the double line X-Y shows the operation of the base station 11 side, while the bottom half (and FIG. 3) shows the operation and control means on the mobile unit 12 side. Note that the control process on the mobile unit 12 side, for convenience of explanation, is shown proceeding from the bottom to top.

Starting the explanation from the bottom of FIG. 3, at step 1 (ST1), whether or not a mobile unit is a car-mounted unit or a handheld unit is indicated to the CPU in the unit by a manual switch. This is because, as explained earlier, there is a difference in the standby reception ability between a car-mounted unit and handheld unit. If the mobile unit 12 is a dual car-mounted/handheld unit, this distinction is important. Note that the rest of the explanation of the invention will be made with reference to such a dual unit.

The determination at step 1 (ST1) is made by the mobile unit mode recognition unit 21.

At step 2 (ST2), the speed of motion of the mobile unit 12 is determined by the manual switch and indicated to the CPU in the unit. This is because in general the received field strength (level of reception) of a carrier at a mobile unit 12 differs at the time of high speed motion and low speed motion. The level of reception of the former is lower.

The determination at step 2 (ST2) is made by the motion speed recognition unit 22.

Referring to FIG. 2, at step 3 (ST3), the determination of what mode of communication the unit is communicating in is indicated to the CPU by the manual switch. As typical examples, there are a normal communication mode (normal speech etc.), an emergency communication mode (notification of natural disasters or traffic accidents), and a data transfer mode (data transfer by fax or handheld data terminal).

The determination at step 3 (ST3) is made by a communication mode recognition unit 23.

The information on the recognized communication mode such as the modes shown in FIG. 2 and the information on the recognized communication mode based on the modes of communication of the information at step 3 are sent to a control unit 24.

On the other hand, broadcast information including standby information having a plurality of types of standby conditions corresponding to the different modes of communication from the base station 11 is sent to the mobile units 12 as shown at the top of FIG. 2. Receiving units 25 of the mobile units 12 receive this. This is also sent to the control unit 24.

At step 4 (ST4), a mobile unit receives signals under the standby condition conforming to its mode of communication in accordance with the received standby information. At step 5 (ST5), it executes standby control under the standby condition conforming to its mode of communication in accordance with the received standby condition.

Note that the various modes of communication set as above are not fixed and can be changed in accordance with the situation such as by operating a manual switch. This switching can also be performed automatically. This will be discussed later.

Figure 5:
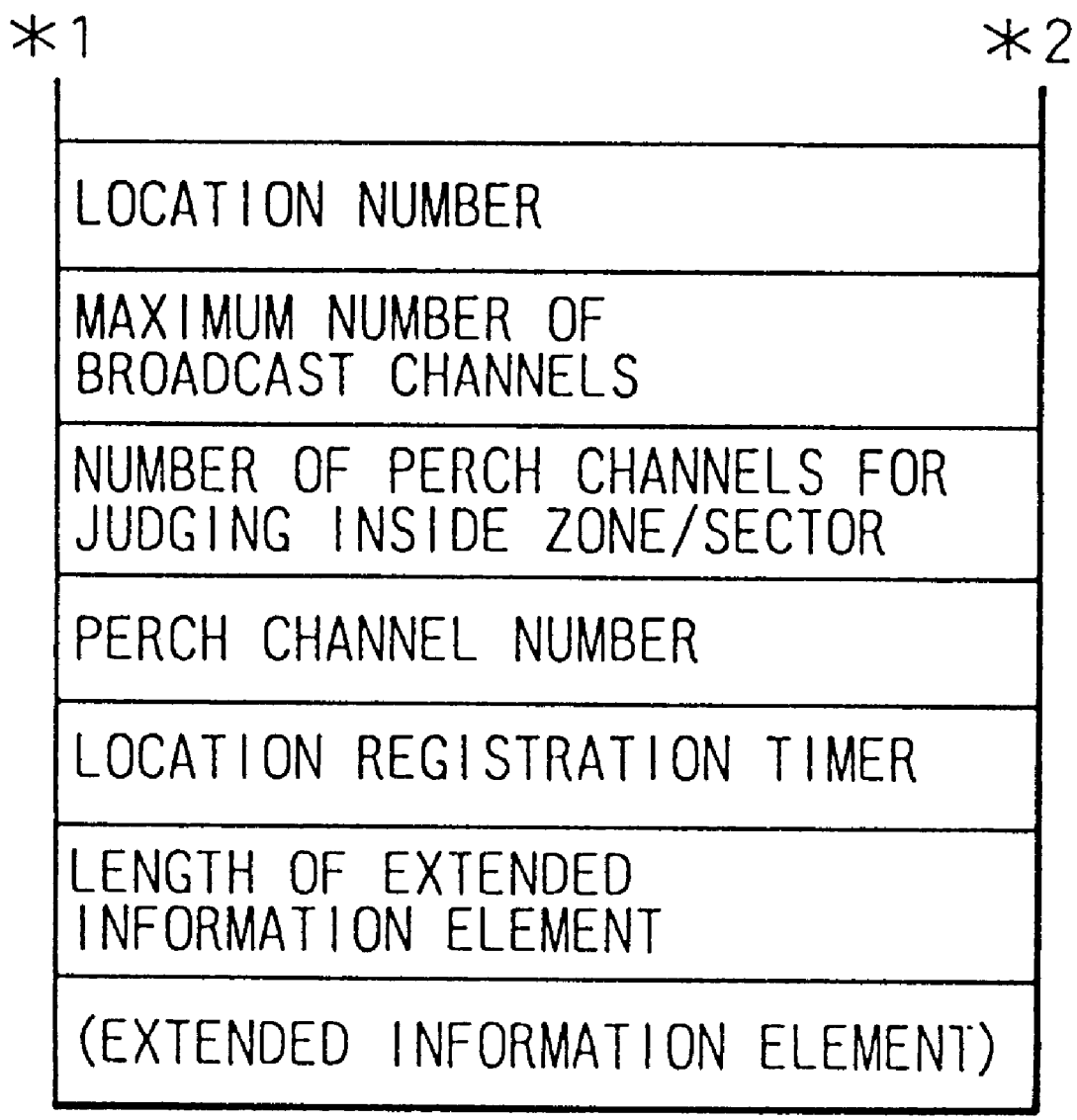
FIG. 5 is a view of the signal format (part 2) showing a first example of broadcast information according to the present invention.

FIG. 4 and FIG. 5 are views of the signal format (parts 1 and 2) showing a first example of broadcast information according to the present invention. Note that the right column in FIG. 4 shows the more detailed signal format of portions at the left column (correspondence indicated by broken lines).

In this first example, the standby enabling condition and the standby disabling condition are made the standby enabling level and the standby disabling level, respectively. Also, these are divided into further levels for use as car-mounted unit and handheld unit.

In the right column of the figure, each of the four levels is further divided into levels for normal communication use, emergency communication use, and data transfer use. This results in levels for a total of 12 modes of communication in all.

FIG. 6 and FIG. 7 are views of the signal format (parts 1 and 2) showing a second example of broadcast information according to the present invention. These figures should be viewed in the same manner as with FIG. 4 and FIG. 5.

In the second example, the standby enabling condition and the standby disabling condition of FIG. 35 are made the standby enabling level and the standby disabling level too. First, these are divided into levels for a car-mounted unit and for a handheld unit.

These divided levels are in turn divided into levels for high speed motion and low speed motion.

In the right column of the figure, further, each of these eight divided levels is in turn divided into levels for normal communication, emergency communication, and data transfer. In total, therefore, the levels are divided into ones for 24 modes of communication.

FIG. 8 and FIG. 9 are views of the signal format (parts 1 and 2) showing a third example of broadcast information according to the present invention. These figures should be viewed in the same manner as with FIG. 4 and FIG. 5.

In the third example, the standby enabling condition and the standby disabling condition of FIG. 35 are made the standby enabling level and the standby disabling level as well. First, these are divided into levels for a car-mounted unit and for a handheld unit (4 levels).

In the right column of the figure, further, each of these four divided levels is in turn divided into levels for normal communication, emergency communication, and data transfer.

Further, these are in turn divided into levels for high speed motion and low speed motion. In total, therefore, the levels are divided into ones for 24 modes of communication.

FIG. 10 is a view of a first example of the method of expressing the standby level of reception. There are several ways of expressing the standby level of reception shown from FIG. 6 to FIG. 9. This first example is one where the standby level of reception is indicated by an absolute value. As shown by the numerical examples in the right column of the figure, when the normal communication standby enabling level is 17 dB $\mu$, the emergency communication level is set to a lower 7 dB $\mu$ so that a call is possible even at the fringe of a zone or a location slightly out of the zone though without a guarantee of call quality.

Conversely, for data transfer, a call is allowed only at a location with considerably good call conditions (25 dB $\mu$) so as to prevent data error.

The above is the same for the standby disabling level as well. In the illustrated example, the level is divided into 14 dB $\mu$, 4 dB $\mu$, and 22 db $\mu$ for the three modes of communication.

FIG. 11 is a view of a second example of the method of expressing the standby level of reception. According to this second example of expression of the standby level of reception, the emergency communication standby reception (enabling/disabling) level and the data transfer standby reception (enabling/disabling) level are indicated by relative values based on the value of the normal communication standby reception (enabling/disabling) level. Specific figures are shown in the right column of the figure.

FIG. 12 is a view of a third example of the method of expressing the standby level of reception. According to the third example of the method of expression of the standby level of reception, the standby condition is determined by the prescribed bit error rate (BER). In recent years, digital car phones have spread in use. In such cases, it becomes necessary to monitor the bit error rate. The value of the bit error rate is prescribed in advance. In the present invention, it is set to $10^{-3}$, $5\times10^{-2}$, and $10^{-4}$ as illustrated in accordance with the different modes of communication.

FIG. 13 is a view illustrating an example of the configuration of a manual type mobile unit, while FIG. 14 is a view illustrating an example of the configuration of an automatic type. Note that constituent elements in these figures similar to those shown in FIG. 2 and FIG. 3 are shown by the same reference numerals. In the two figures, the mobile unit receives the broadcast information for each mode of communication, given from the left side in the figure (base station 11 side), through an antenna 26 at the receiving unit 25. It executes standby control based on this broadcast information by the control unit 24.

The communication mode recognition unit 23 of FIG. 13, as illustrated by a block 33, recognizes if the mode is the normal communication mode, emergency communication mode, or data transfer mode in accordance with the state of connection of a first manual switch (SW).

Further, the motion speed recognition unit 22, as illustrated by a block 32, recognizes if the mode is the high speed motion communication mode or the low speed motion communication mode in accordance with the state of connection of a second manual switch (SW).

Further, the mobile unit mode recognition unit 21, as illustrated by a block 31, recognizes if the mode is the car-mounted unit communication mode or the handheld unit communication mode in accordance with the state of connection of a third manual switch (SW).

On the other hand, referring to FIG. 14, the communication mode recognition unit 23, as illustrated by blocks 43 and 44, automatically recognizes if the mode is the normal communication mode, emergency communication mode, or data transfer mode by a first electric detection means and monitors the telephone number to automatically recognize if the mode is a normal communication mode or emergency communication mode by a second electric detection means.

The motion speed recognition unit 22, as illustrated by a block 42, monitors the pitch of variation of the level of reception of the signal from the base station 11 and estimates the speed of motion of the mobile unit (12) so as to automatically recognize if the mode is the high speed motion communication mode or the low speed motion communication mode by a third electric detection means.

The mobile unit mode recognition unit 21, as illustrated by a block 41, monitors if the antenna is the antenna of the car-mounted unit side or the antenna of the handheld unit side to automatically recognize if the mode is the car-mounted unit communication mode or the handheld unit communication mode using a fourth electric detection means and monitors if the power source is the power source of the car-mounted unit side or the power source of the handheld unit side to automatically recognize if the mode is the car-mounted unit communication mode or the handheld unit communication mode using a fifth electric detection means.

FIG. 15 is a view of the state of assembly of the CPU and peripheral portions related to the present invention in a known example of the configuration of a mobile unit. A manual communication mode setting means 46 and an automatic communication mode recognition means 47 are newly introduced by the present invention. The former means 46 corresponds to blocks 31 to 33 in FIG. 13. The latter means 47 corresponds to the blocks 41 to 44 in FIG. 14. Note that due to the use of the means 46 and/or means 47, the software in the control unit (CPU) is also modified from that of the past.

The receiving unit 25 shown in FIG. 13 and FIG. 14 is comprised by transmitter/receiver 251, receivers 252 and 253 (forming a diversity), a demodulator (ACT: adaptive carrier tracking) 254, etc.

The rest of the configuration shown in FIG. 15 is as follows: Reference numerals 51 and 52 show a microphone (MIC) and speaker (SP) and constitute the handset. The inputs and outputs of the same are connected through a CODER and DECODER (CODEC) 53 to a time division multiple access (TDMA) circuit 54. The TDMA circuit 54 is connected to the demodulator 254, the CPU 60, and a wave shaping circuit 55 as well.

The data transmitted from the wave shaping unit 55 is modulated by an RF band orthogonal modulator 56 and sent via a power amplifier (LSA-BC: linearized saturation amplifier with bidirectional feed control) 57. The modulation in the modulator 56 is performed by a carrier from the high speed switching synthesizer, i.e., the digital loop preset synthesizer (DLPS), including inside it a phase-locked loop oscillator (PLO). The synthesizer 58 supplies the demodulating carrier to the receivers 252 and 253 forming the diversity as well.

In the CPU 60 are shown schematically the above-mentioned control unit 24, the mobile unit mode recognition unit 21, the motion speed recognition unit 22, and the communication mode recognition unit 23. The CPU 60 also has connected to it an operation unit (ten key pad etc.) 59, a manual switch 70 (46) for setting which mode among the plurality of modes of communication the unit should be in, and an electric detection means 80 (47) for automatically recognizing which mode among the plurality of modes of communication the unit is in.

Figure 16:
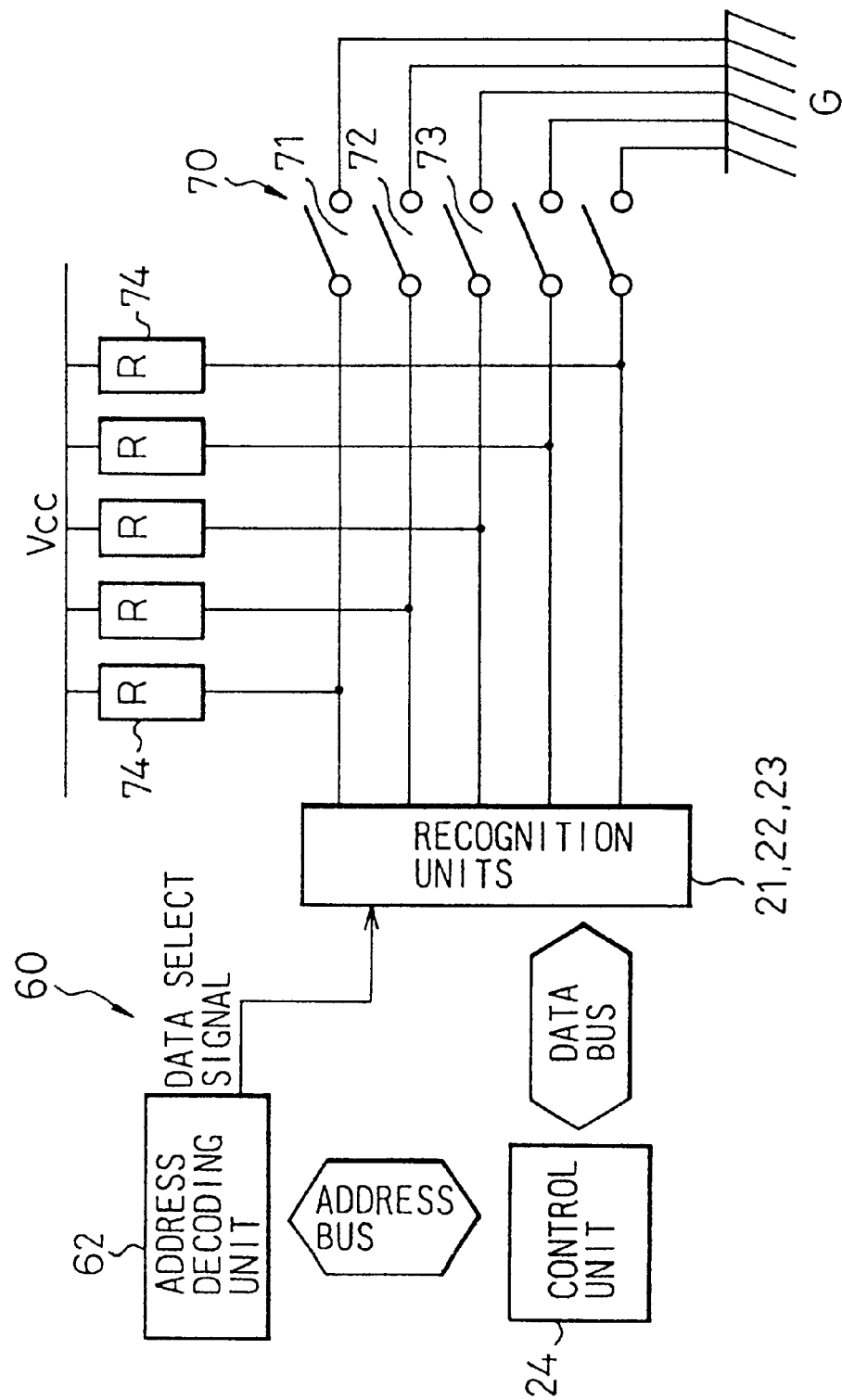
FIG. 16 is a view of the connection of a CPU 60 and manual switch 70.

FIG. 16 is a view of the connection configuration of a CPU 60 and a manual switch 70. In the CPU 60 of the figure, there are shown the various recognition units (21, 22, and 23) shown in FIG. 15 and also an address decoding unit 62. On the other hand, the manual switch 70 is comprised of a first manual switch 71 for recognizing if the mode is the normal communication mode, emergency communication mode, or data transfer mode; a second manual switch for recognizing if the mode is the high speed motion communication mode or the low speed motion communication mode; and a third manual switch for recognizing if the mode is the car-mounted unit communication mode or the handheld unit communication mode. Other manual switches may be provided in accordance with need.

The recognition units (21, 22, and 23) receive the power source Vcc level through the resistor (R) 74 and are a logic "H" when the manual switch is off. When any of the manual switches is turned on, they are lowered to the ground (G) level and become the logic "L".

The recognition units (21, 22, and 23) receive the "H" or "L" corresponding to these manual switches and hold the same rewritably. An address decoding unit 62 outputs a data select signal, sequentially repeats "H"/"L" data, and reads out the same to the control unit 24.

The electric detection means 80 shown in FIG. 15 includes a first electric detection means for automatically recognizing if the mode is the normal communication mode, the emergency communication mode, or the data transfer mode; a second electric detection means for monitoring the telephone number to automatically recognize if the mode is in the normal communication mode or the emergency communication mode; a third electric detection means for monitoring the pitch of variation of the level of reception of the signal from the base station 11 and estimating the speed of motion of the mobile unit 12 to automatically recognize if the mode is the high speed motion communication mode or the low speed motion communication mode; a fourth electric detection means for monitoring if the unit is connected to the car-mounted unit side antenna or the handheld unit side antenna to automatically recognize if the mode is the car-mounted unit communication mode or the handheld unit communication mode; and a fifth electric detection means for monitoring if the unit is connected to the car-mounted unit side power source or the handheld unit side power source to automatically recognize if the mode is the car-mounted unit communication mode or the handheld unit communication mode. Specific examples of several of these will be shown.

Figure 17:
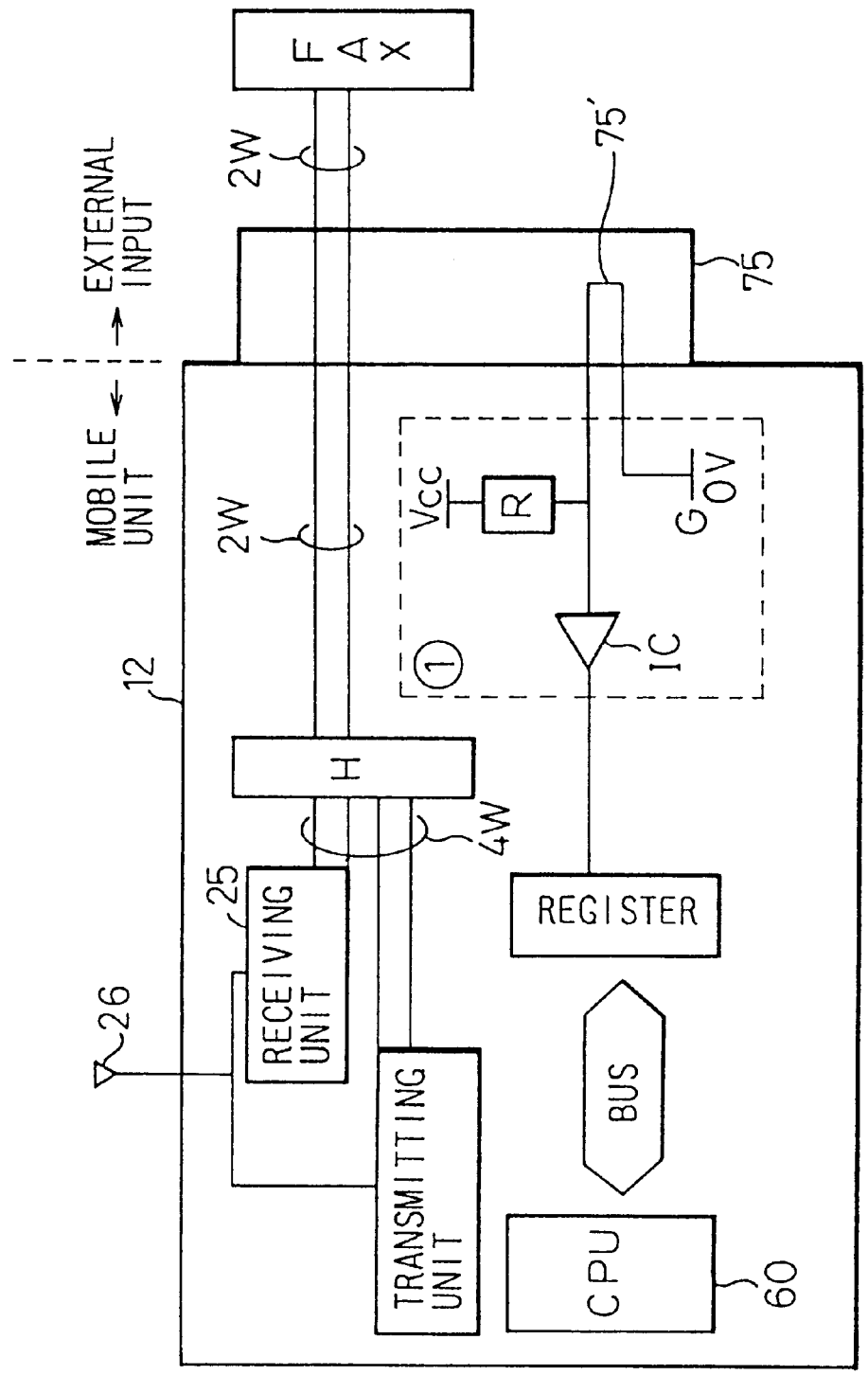
FIG. 17 is a view of an example of a means for detecting a data transfer mode.

FIG. 17 is a view of an example of a means for detecting a data transfer mode. This corresponds to the above-mentioned first electric detection means. For example, when transferring data by a facsimile apparatus (FAX), when plugging in a connector 75 for connection to the body of the mobile unit 12, connection is made with a loop 75' in the connector 75 and the input of the register changes from the logic "H" to the logic "L". The CPU 60 reads out this "L" and determines that the mode of communication is for data transfer. Note that the 2W in the figure means two-wire, 4W means 4-wire, and H means hybrid.

Figure 18:
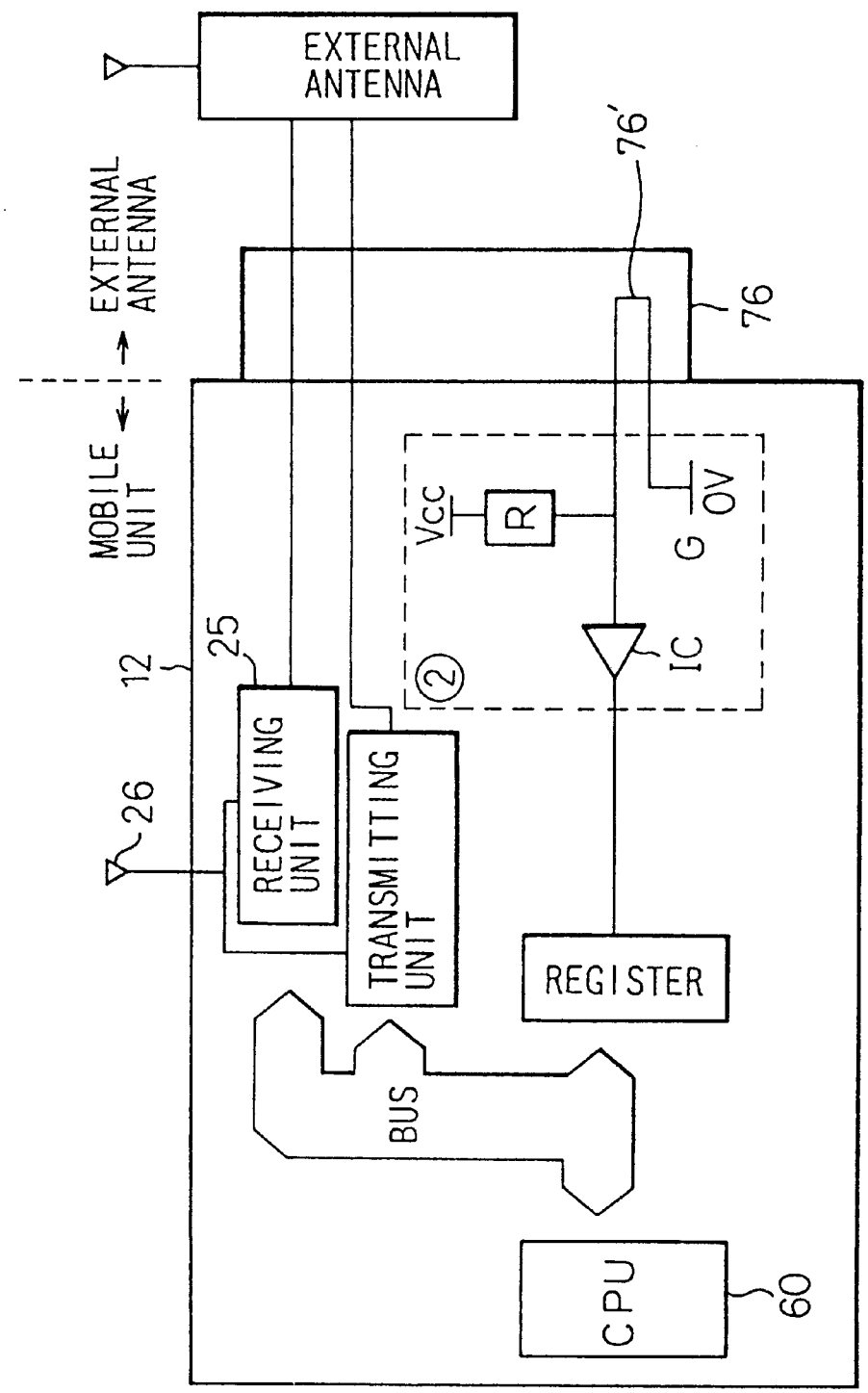
FIG. 18 is a view of an example of a means for detecting a type of antenna.

FIG. 18 is a view of an example of a means for detecting an antenna type. This corresponds to the fourth electric detection means. When using a car-mounted unit side antenna (external antenna), the external antenna is connected through a connector 76 to the main body of the mobile unit 12. When the connector 76 is plugged in, a loop 76' in the connector 76 is connected with and the input of the register changes from the logic "H" to the logic "L". This "L" is read out by the CPU 60 whereby it is learned that the mode of communication is one of a car-mounted unit.

Figure 19:
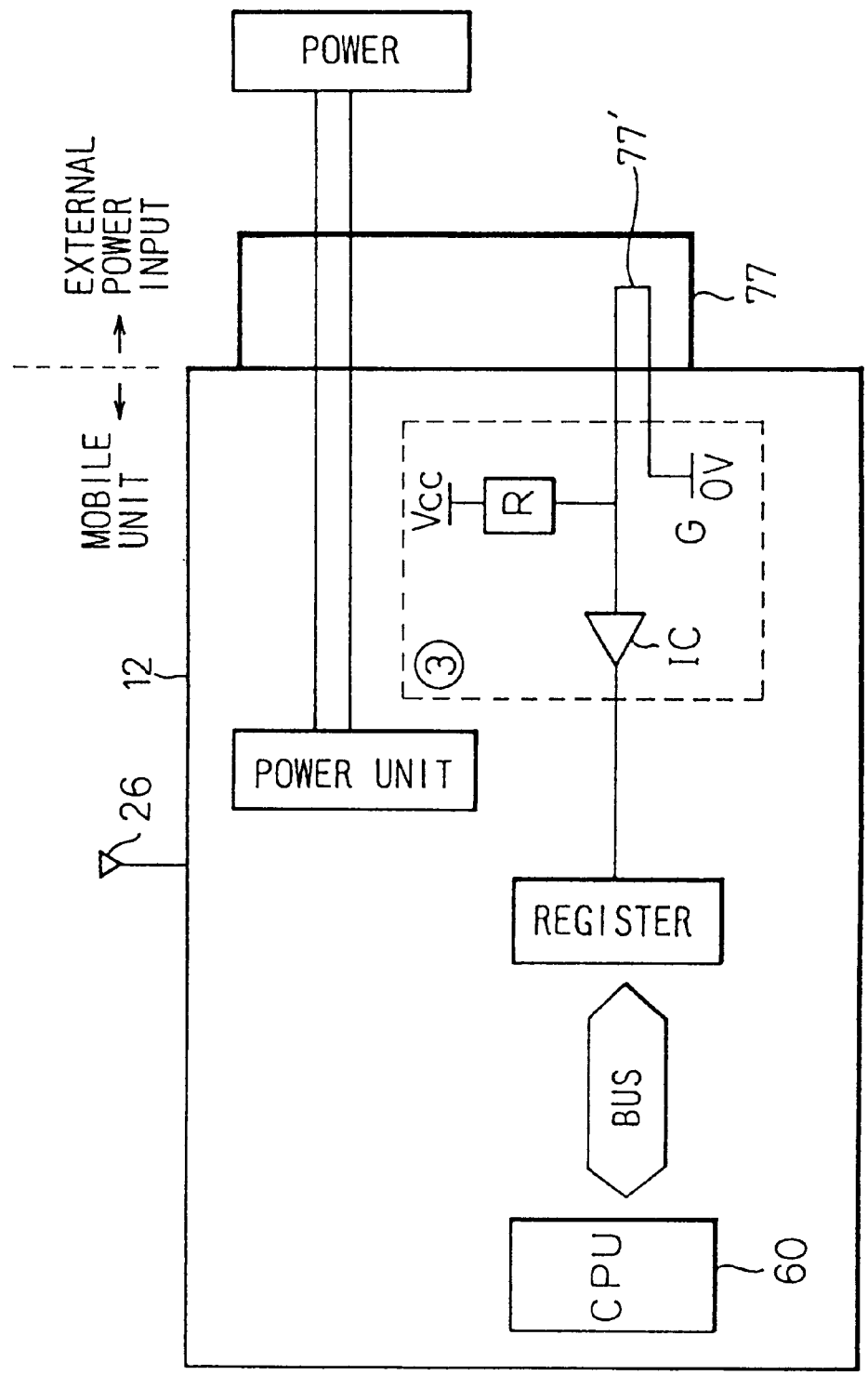
FIG. 19 is a view of an example of a means for detecting a type of power source.

FIG. 19 is a view of an example of a means for detecting a type of a power source. This corresponds to the fifth electric detection means. When used as a car-mounted unit, the power source (car battery) is connected to the main body of the mobile unit 12 through a connector 77. When the connector 77 is plugged in, a loop 77' in the connector 77 is connected with and the input of the register changes from the logic "H" to the logic "L". This "L" is read out by the CPU 60, whereby it is learned that the mode of communication is one of a car-mounted unit.

Note that the above-mentioned second electric detection means can be realized by a decoder which identifies for example emergency dial pulses such as 110 or 119 in Japan and 911 in the U.S.

Further, it is possible to realize a means corresponding to the third electric detection means by a sensor which monitors the readings of the speedometer of the car. This technique, however, is costly, so it is preferable to use a diversity antenna of the mobile unit 12 (26 and 26' in FIG. 15) and estimate the speed of motion of the mobile unit 12. That is, the pitch of variation of the level of signal reception from the base station is monitored to estimate the speed of motion. This will be explained briefly with reference to the figures.

Figure 20:
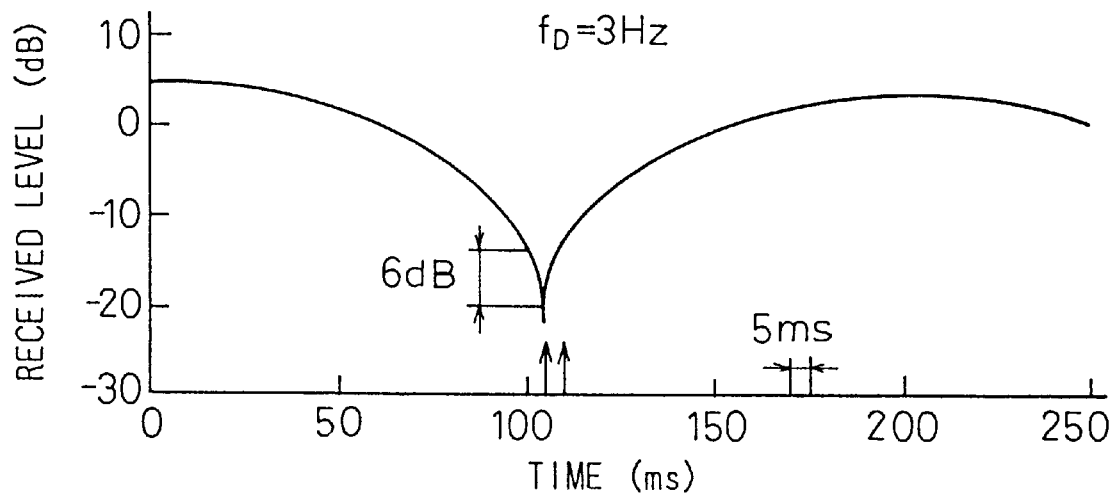
FIG. 20 is a view (part 1) for explaining the principle of the method of estimating a speed of motion.
Figure 21:
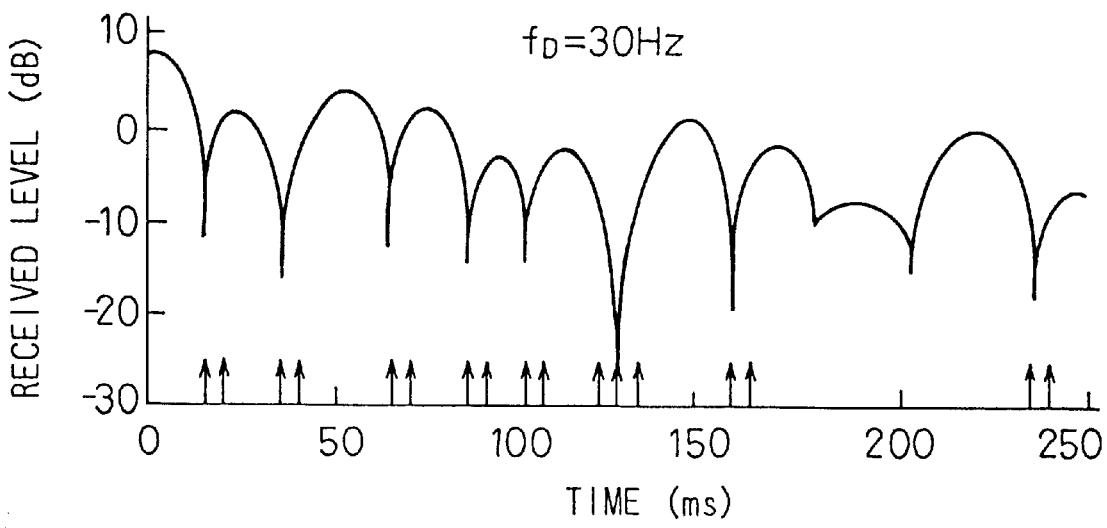
FIG. 21 is a view (part 2) for explaining the principle of the method of estimating a speed of motion.

FIG. 20 and 21 are views (parts 1 and 2) for explaining the principle of the method of estimating a speed of motion.

The pitch of variation of the level of reception at the time of fading depends on the speed of motion. FIGS. 20 and 21 show the levels of reception in the cases of Doppler frequencies $f_D$ of 3 Hz and 30 Hz. A change in level by more than 6 dB in a 5 ms interval is shown by an arrow mark on the horizontal axis. This was detected two times in a 250 ms interval in the case of $f_D$ of 3 Hz and 17 times, or close to 10 times the frequency, in the case of an $f_D$ of 30 Hz. Accordingly, the larger the $f_D$ (and therefore the speed of motion), the greater the probability of a sharp change in level, it is learned. This method of estimation of the speed of motion utilizes this property. Note that this method of estimation of speed of motion was already proposed in the 1993 Fall Conference of the Institute of Electronics, Information, and Communication (p. 2 to 327).

Next, an explanation will be made of the operation based on the present invention.

Figure 22:
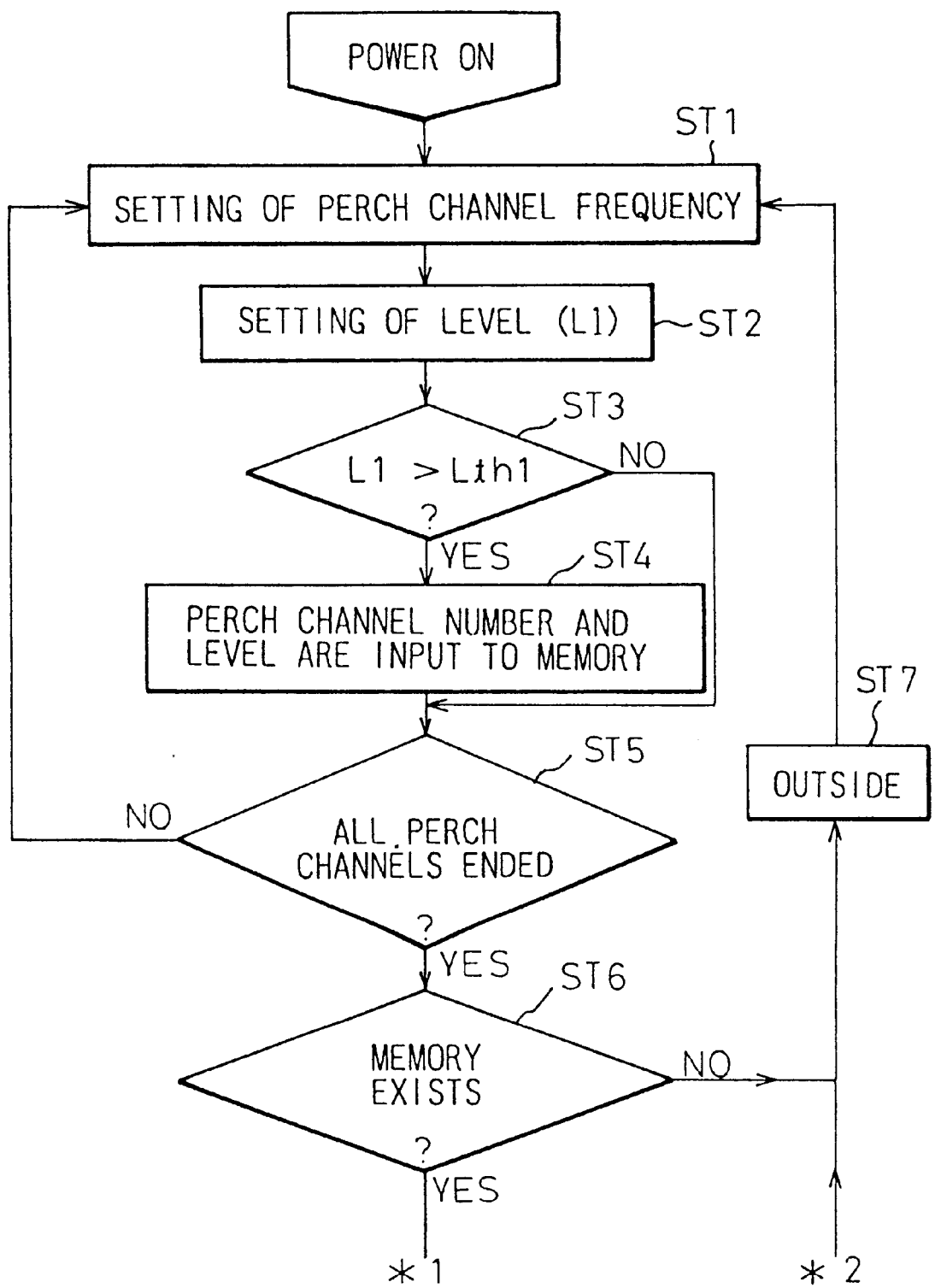
Figure 23:
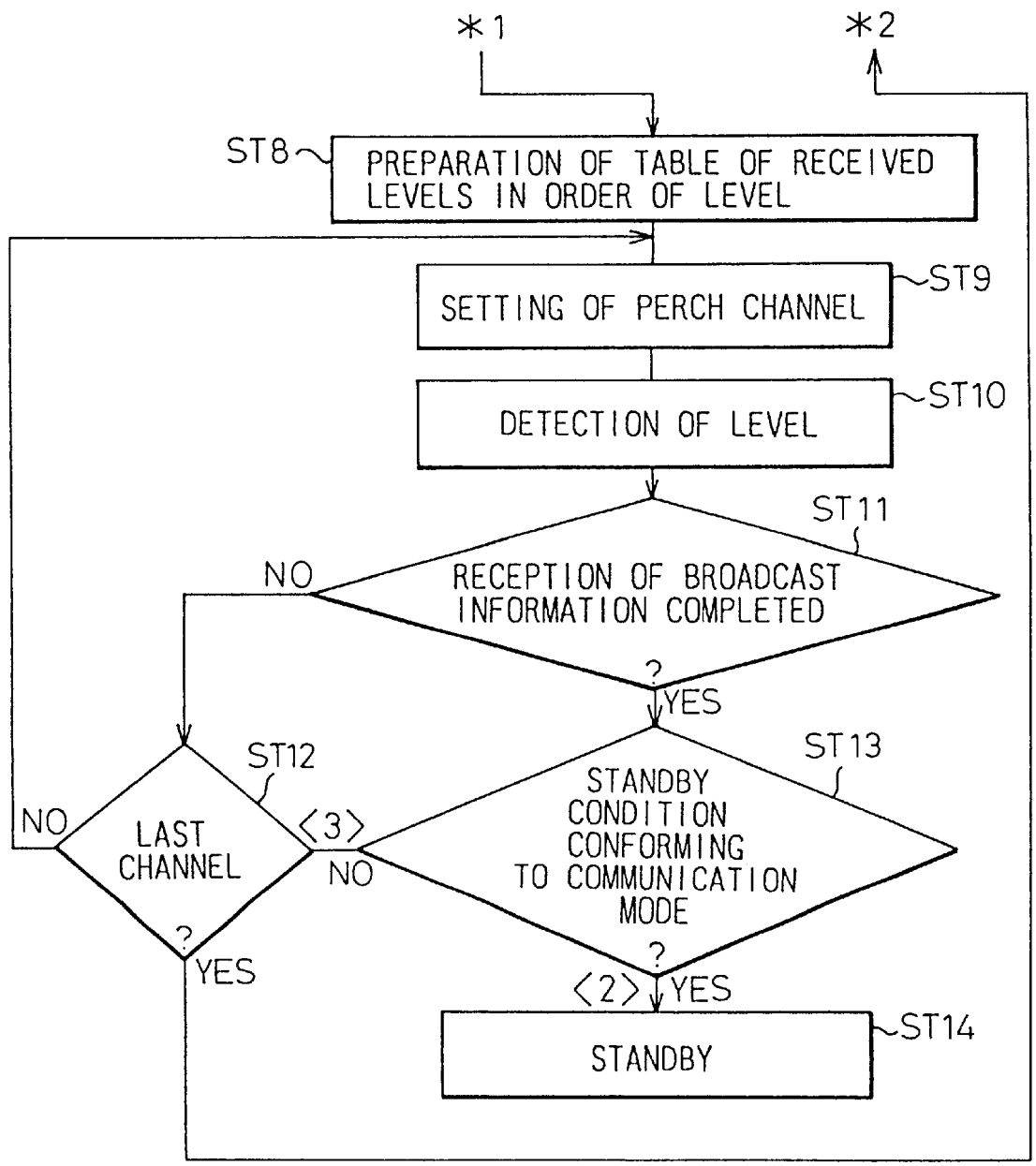

FIG. 22 and FIG. 23 are parts of a flow chart of the operation by which a mobile unit shifts to a standby state at the time power is turned on. Note that in the flow chart, the step which is newly introduced according to the present invention is step 13 (ST13) in FIG. 23. The rest of the steps are known.

Step 1 (ST1)

When the mobile unit 12 is turned on, it receives the broadcast information from the base station 11 and is supplied with a plurality of perch frequencies by that information. It uses one of the perch frequencies as the above-mentioned radio control channel and executes standby control (step 14 (ST14)).

Step 2 (ST2)

The mobile unit 12 then measures the level of reception (received field strength) of that single perch frequency channel (perch channel). The measured value is expressed by L1.

Step 3 (ST3)

The mobile unit 12 then detects if the measured value L1 is larger than an elimination level $L_{th1}$.

Step 4 (ST4)

The mobile unit 12 stores a perch channel with a value larger than the elimination level in its memory (61 in FIG. 15).

Step 5 (ST5)

The mobile unit 12 performs a similar operation as in steps 1 to 4 for all perch channels.

Step 6 (ST6)

When there is not even one perch channel to be stored in the memory 61, the mobile unit 12 is deemed to be out of the zone and cannot engage in a call.

Step 7 (ST7)

If deemed out of the zone, the mobile unit 12 returns to step 1 (ST1).

Step 8 (ST8) (FIG. 23)

The mobile unit 12 reads out the content of the memory 61 and arranges the channels in the order of the highest level of reception down to prepare a table of effective perch channels. This table may be prepared in another region of the memory 61 as well.

Step 9 (ST9)

The mobile unit 12 refers to the table and sets itself to the perch channel with the highest level of reception.

Step 10 (ST10)

The mobile unit 12 measures the level of reception once again for the perch channel selected at step 9. It makes this measured value L2.

Step 11 (ST11)

The mobile unit 12 uses this perch channel as the final radio control channel and receives the above mentioned broadcast information. When it does not finish receiving the information normally, it proceeds to the next step (ST12).

Step 12 (ST12)

If the mobile unit 12 cannot receive the broadcast information normally for any of the perch channels listed in the table, it proceeds to step 7 (ST7). That is, it is deemed to be out of the zone.

Step 13 (ST13)

Step 13 is the step characterizing the present invention. Here, the mobile unit judges whether or not it has cleared the standby condition for the mode of communication it is in out of the various modes of communication (L2>$L_{th2}$?) If judged OK, it then first proceeds to the next step (ST14). $L_{th2}$ is the standby enabling level.

Step 14 (ST14)

Here, the mobile unit 12 starts the standby control.

Figure 24:
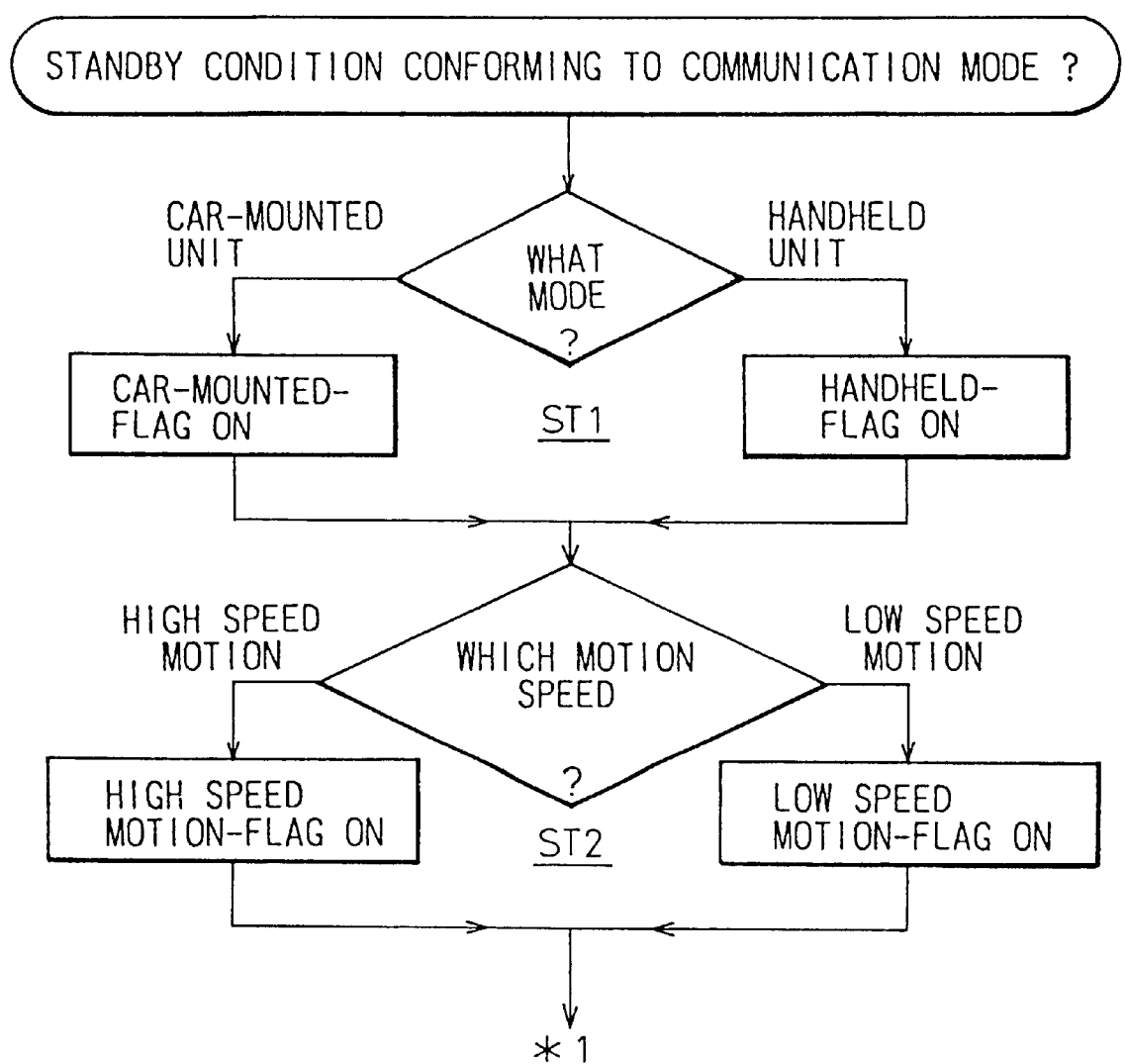
FIG. 24 is a flow chart (part 1) showing a detailed example of step 13 shown in FIG. 23.
Figure 25:
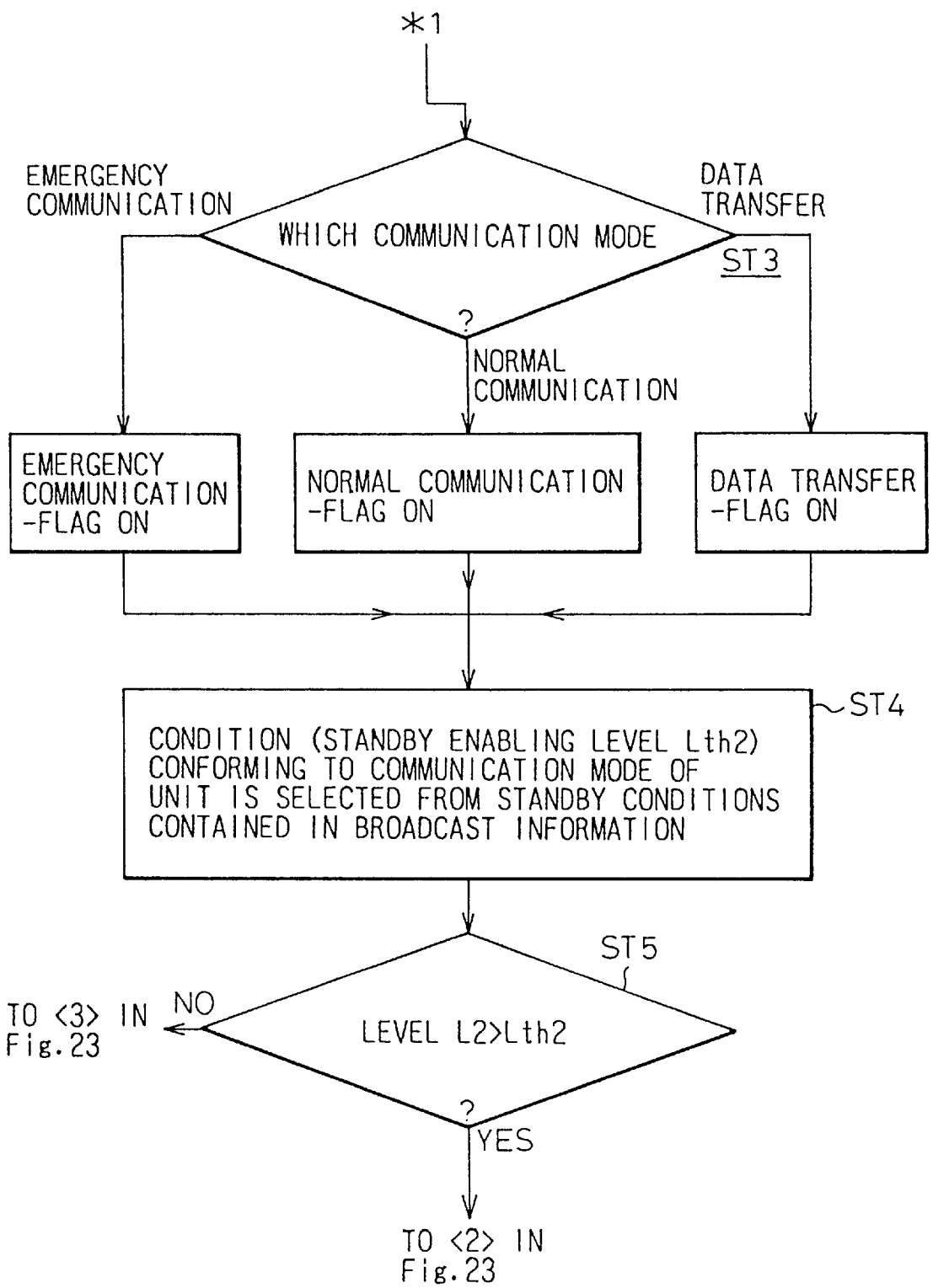
FIG. 25 is a flow chart (part 2) showing a detailed example of step 13 shown in FIG. 23.

FIG. 24 and FIG. 25 are parts of a flow chart showing a detailed example of step 13 shown in FIG. 23. The flow chart of FIG. 24 and FIG. 25 show the procedure for judging if the standby condition is for the mode of communication of the unit.

Step 1 (ST1)

The mobile unit 12 judges if it is operating as a car-mounted unit or a handheld unit. If the car-mounting flag is ON, it is operating as a car-mounted unit, while if the handheld flag is ON, it is operating as a handheld unit. The ON/OFF states of the flags are set in the recognition units 21, 22, and 23 of FIG. 16 or the register shown in FIG. 19.

Step 2 (ST2)

The mobile unit 12 judges if it is in a high speed motion or low speed motion. If the high speed motion flag is ON, it is in high speed motion, while if the low speed motion flag is ON, it is in low speed motion. The ON/OFF states of the flags are set in the recognition units 21, 22, and 23 of FIG. 16 or the predetermined register (not shown) in the CPU 60 holding the results of detection of the third electric detection means.

Step 3 (ST3) (FIG. 25)

The mobile unit 12 detects which mode of communication it desires to engage in a call in.

If desiring emergency communication, that flag is turned ON. If normal communication, the corresponding flag is turned ON. If data transfer, that flag is turned ON. The ON/OFF states of the flags are set in the recognition units 21, 22, and 23 of FIG. 16 or the predetermined register (not shown) in the CPU 60 holding the results of detection of the second electric detection means.

Step 4 (ST4)

As shown in FIG. 4, FIG. 6, FIG. 7, FIG. 8, and FIG. 9, the mobile unit 12 selects the condition conforming to its mode of communication from among the standby conditions prescribed in the broadcast information and proceeds to the next step (ST5).

Step 5 (ST5)

The mobile unit 12 investigates if L2>$L_{th2}$ explained with reference to step 13 (ST13) in FIG. 23 is satisfied. The result (YES or NO) appears at <2> or <3> of FIG. 23.

Figure 26:
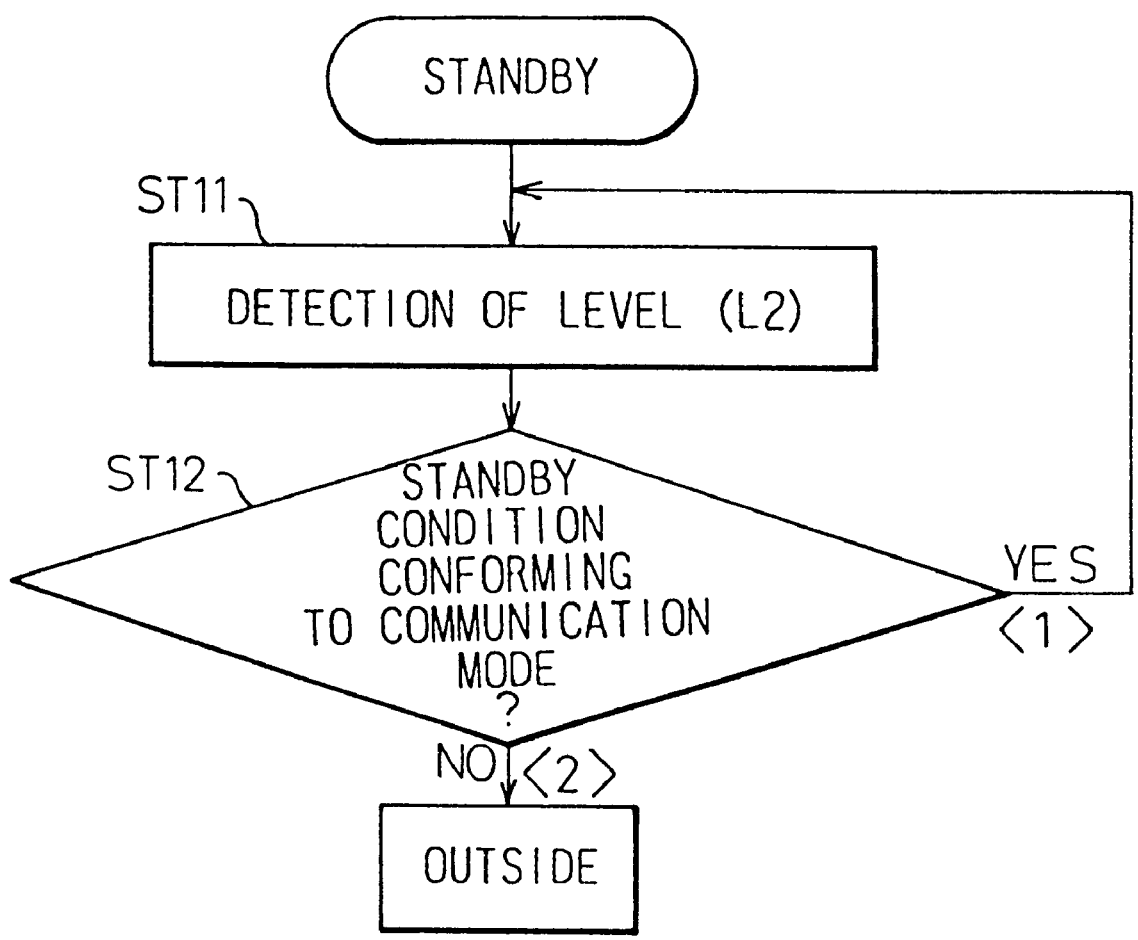
FIG. 26 is a flow chart of the operation for dealing with changes in mode in a standby state.

FIG. 26 is a flow chart of the operation for dealing with changes in mode in a standby state. Even after a call is started, the mode of communication or the state of communication changes with each instant. Therefore, the flow of operation of this figure is required. In particular, since this case refers to a change after the start of a call, the standby disabling level becomes particularly important among the various standby conditions. This is because if the level falls below the standby disabling level, the mobile unit is deemed out of the zone and can soon no longer maintain communication. Accordingly, the flow of the figure is repeatedly executed, for example, at 2 second intervals.

Step 1 (ST11)

The mobile unit 12 detects the level of reception for example at 2 second intervals. The measured value of the level of reception is made L2 (similar to step 10 (ST10) in FIG. 23).

Step 2 (ST12)

The mobile unit 12 investigates if it has cleared the standby condition for the mode of communication it is currently in (in particular the standby disabling level). If it has not cleared it, it is deemed out of the zone. If it has cleared it, it continues to detect the level of reception (L2) on a repeated basis.

Figure 27:
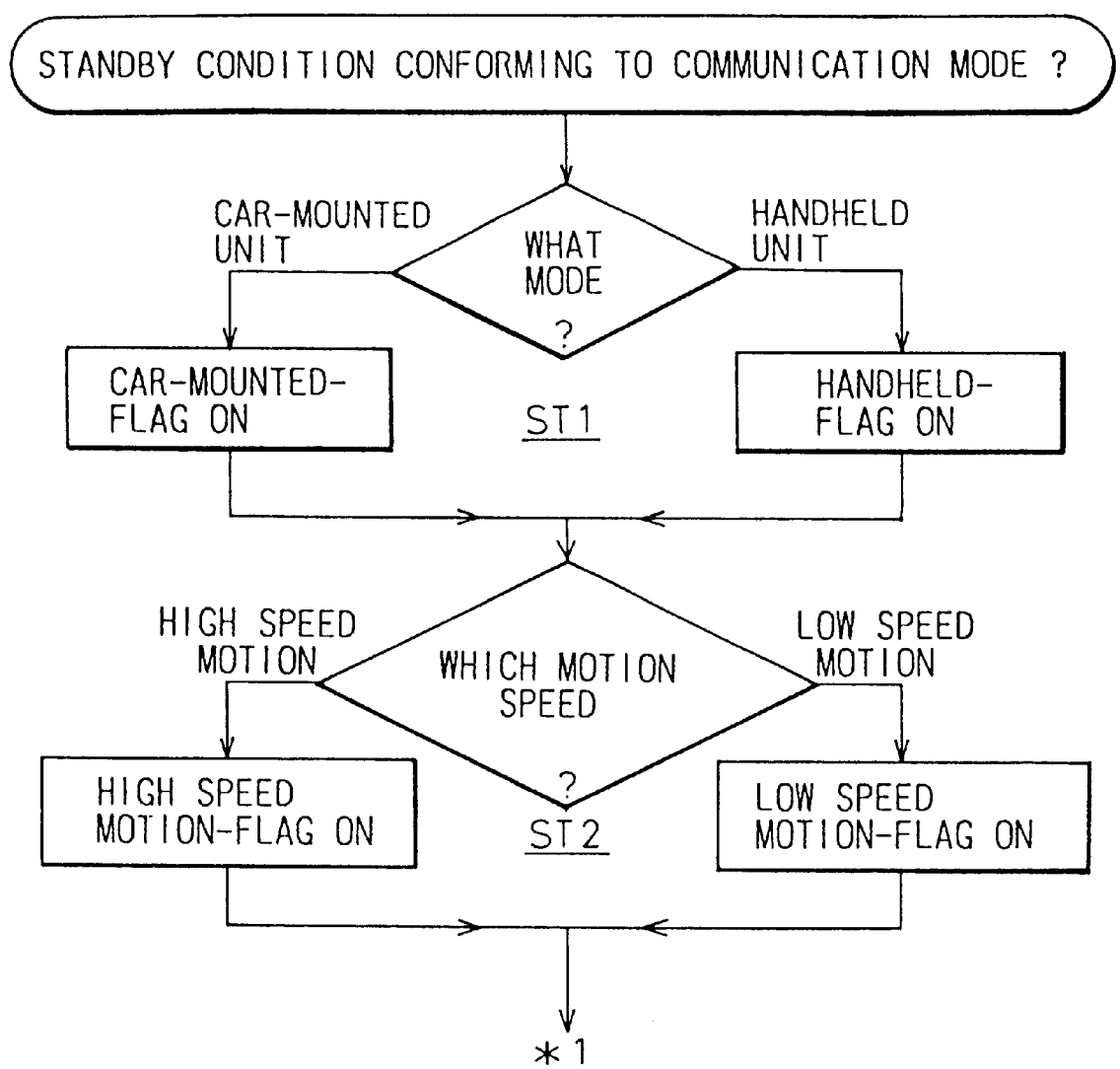
FIG. 27 is a flow chart (part 1) showing a detailed example of step 12 shown in FIG. 26.
Figure 28:
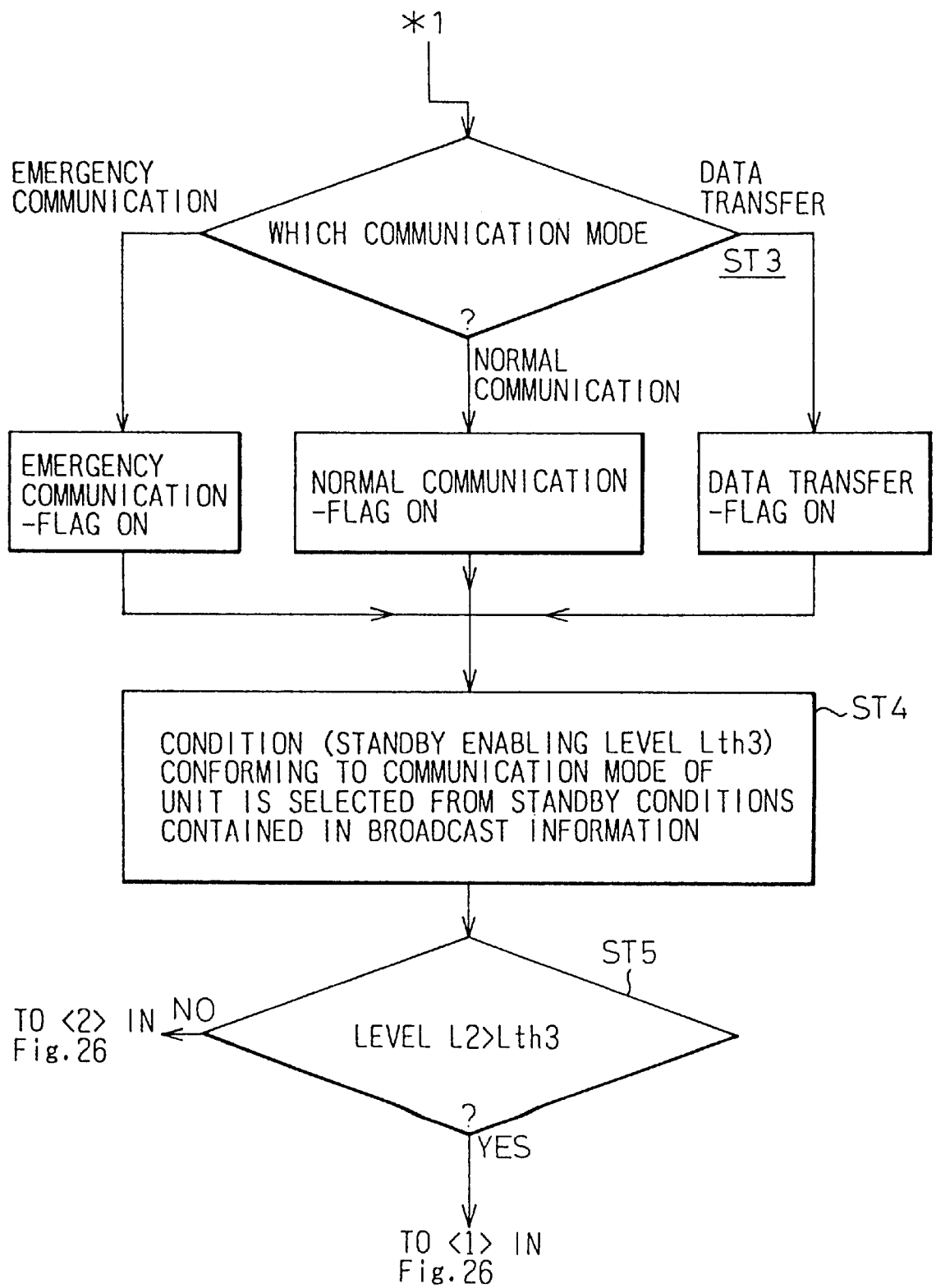
FIG. 28 is a flow chart (part 2) showing a detailed example of step 12 shown in FIG. 26.

FIG. 27 and FIG. 28 are parts of a flow chart showing a detailed example of step ST12 shown in FIG. 26. The steps are mostly similar to those shown in FIG. 24 and FIG. 25 with the exception of the following points. The differences are step 4 (ST4) and step 5 (ST5) shown in FIG. 28.

At step 4 (ST4) of FIG. 25, the standby enabling level $L_{th2}$ was monitored. At the same step of FIG. 28, however, the standby disabling level $L_{th3}$ is monitored.

Further, at step 5 (ST5) of FIG. 25, the level of reception L2 was compared with $L_{th2}$, but at the same step of FIG. 28, the comparison is made with the reference level $L_{th3}$ of the disabling level.

Figure 29:
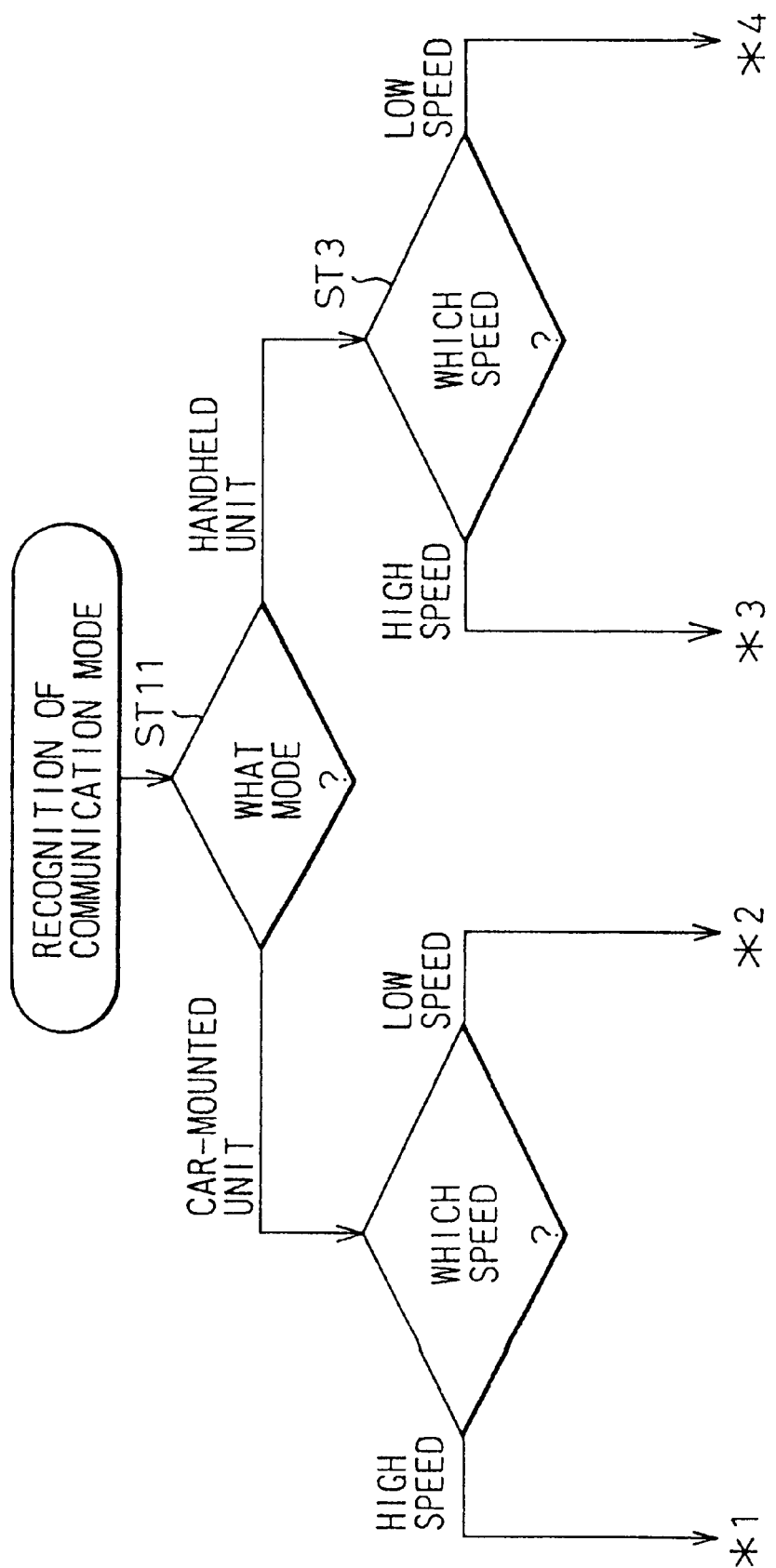
FIG. 29 is a flow chart (part 1) showing an example of an operation by which the CPU 60 selects the standby condition.
Figure 30:
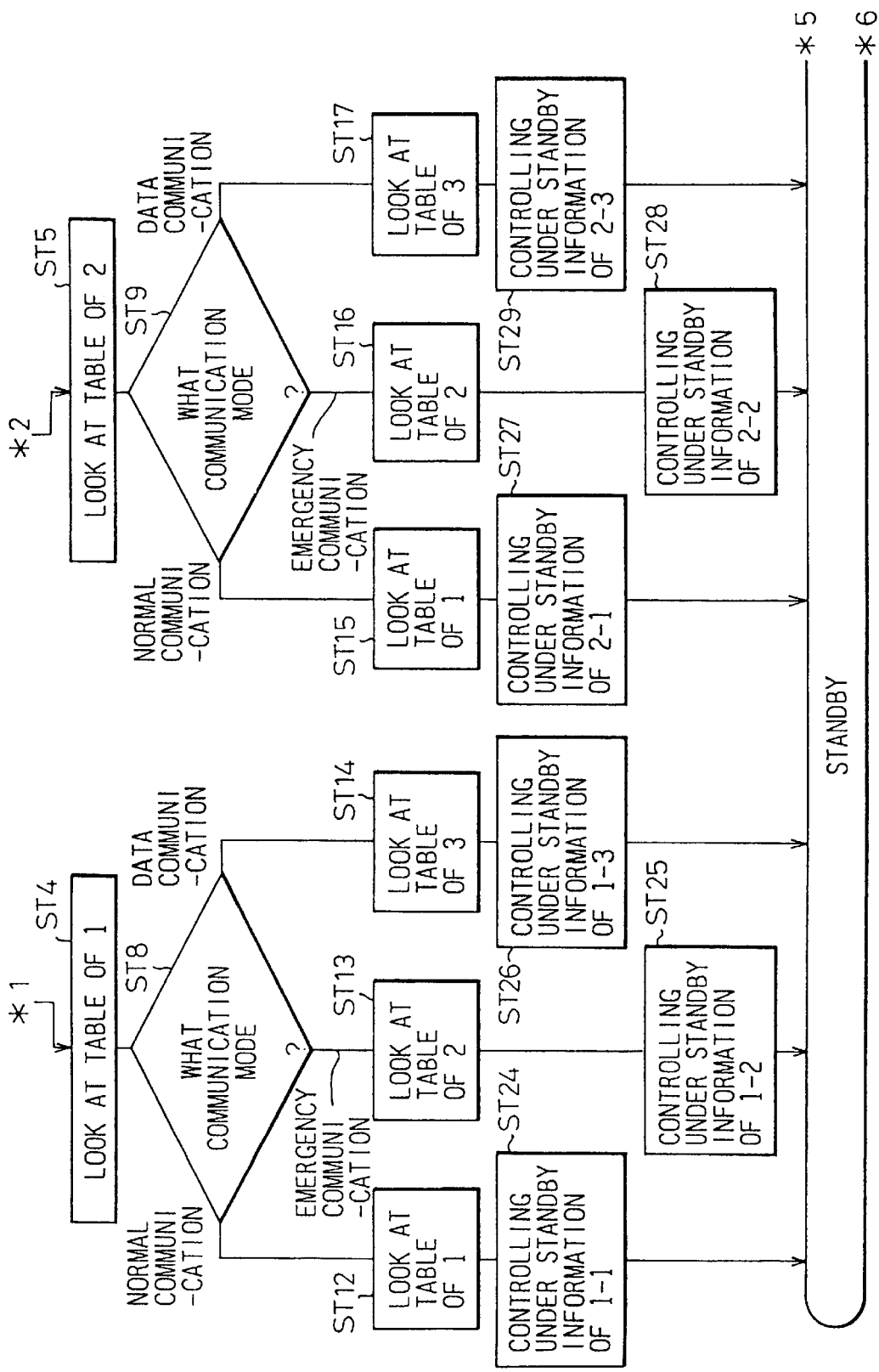
FIG. 30 is a flow chart (part 2) showing an example of an operation by which the CPU 60 selects the standby condition.
Figure 31:
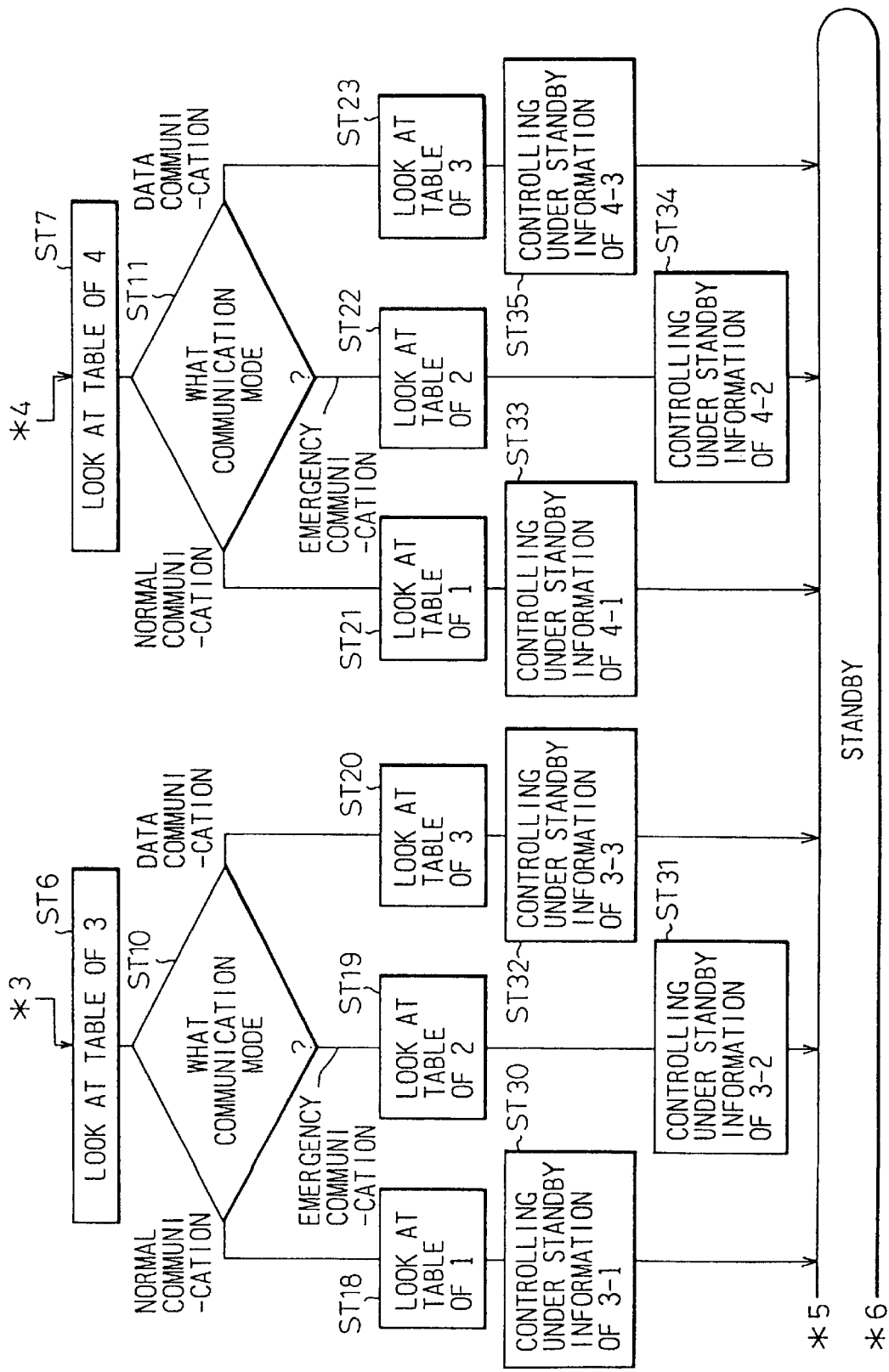
FIG. 31 is a flow chart (part 3) showing an example of an operation by which the CPU 60 selects the standby condition.

FIG. 29, FIG. 30, and FIG. 31 are parts of a flow chart showing an example of an operation by which the CPU 60 selects the standby condition. The routine shown in these figures is explained with reference to the case of the broadcast information shown in FIG. 32 and FIG. 33.

FIG. 32 and FIG. 33 are views of the signal format (parts 1 and 2) showing a fourth example of broadcast information according to the present invention. As shown in FIG. 32 and FIG. 33, the standby information is sent from the base station 11 with identification numbers 1, 2, 3, 4 . . . . The mobile unit 12 receiving the broadcast information writes the information in the memory (61 in FIG. 15) with the identification numbers attached. If new broadcast information is received, it is written over old information in the memory (RAM).

Referring to FIGS. 29, 30, and 31, first, in FIG. 29, step 1 (ST1), step 2 (ST2), and step 3 (ST3) are similar to step 1 (ST1), step 2 (ST2), and step 3 (ST3) shown in FIG. 24.

Next, referring to FIG. 30, in step 4 (ST4), the mobile unit 12 looks at the table (high speed) of the identification number 1 at the left column of FIG. 32. Similarly, at step 5 (ST5) (low speed) of FIG. 30 and step 6 (ST6) (high speed) and step 7 (ST7) (low speed) of FIG. 31, it looks at the tables of the identification numbers 2, 3, and 4 at the left columns of FIG. 32 and FIG. 33.

At step 8 (ST8) of FIG. 30, the mobile unit 12 judges the mode of communication in the same way as at step 3 (ST3) shown in FIG. 25 for example. Note that the other step 9 (ST9) to step 11 (ST11) shown in FIG. 30 and FIG. 31 are all the same as step 8 (ST8) of FIG. 30.

At step 12 (ST12) to step 23 (ST23) in FIG. 30 and FIG. 31, the mobile unit 12 looks at the tables of the identification numbers 1, 2, and 3 shown at the right columns of FIG. 32 and FIG. 33.

Next, at step 24 (ST24) in FIG. 30, the control unit 24 reads out the standby information shown in the table of the identification number 1 at the right column of FIG. 32 belonging to the identification number 1 of the left column of the figure and executes standby control.

At step 25 (ST25) of FIG. 30, the control unit 24 reads out the standby information shown in the table of identification number 2 of the right column of FIG. 32 belonging to the identification number 1 of the left column of the figure.

Next, at step 26 (ST26) of FIG. 30, the control unit 24 reads out the standby information shown in the table of identification number 3 of the right column of FIG. 32 belonging to the identification number 1 of the left column of the figure.

A similar operation is performed at step 27 (ST27) to step 35 (ST35).

As explained above, according to the present invention, it is possible to maintain communication under the optimum standby condition for various modes of communication through discrimination of whether the user wishes to engage in normal speech, notify the authorities of an emergency, or transfer data, is moving at a high speed or low speeds, is using the unit as a car-mounted unit or handheld unit, etc. and thereby to remarkably improve the quality of communication and communication ability.

I claim:

1. A method for standby control in a base station and a mobile unit in a mobile telecommunication network comprised of at least one mobile unit and a base station, said method comprising:

sending to the mobile units information required for standby control with the mobile units via a radio control channel as broadcast information;

broadcasting information including standby control information having a plurality of types of standby conditions conforming to different modes of communication of the mobile units as standby conditions for the mobile units;

recognizing by the mobile units of which of the several modes of communication the mobile units are in;

extracting from the broadcast information the standby condition corresponding to the recognized mode of communication; and executing standby control under the extracted standby condition.

2. A method for standby control in a base station, comprising:

broadcasting to mobile units information required for standby control with the mobile units via a radio control channel, the information including standby control information having a plurality of types of standby conditions indicating a standby enabling condition starting a call and a standby disabling condition inhibiting a call and conforming to different modes of communication of the mobile units as standby conditions for the mobile units, the mobile units: receiving the standby conditions, recognizing which of the different modes of communication the mobile units are in, extracting from the information the standby condition corresponding to the recognized mode of communication, modifying the standby conditions and executing standby operations under the extracted standby condition and responsive to the modified standby conditions.

3. A method for standby control in a base station as set forth in claim 2, wherein the standby conditions are determined by a standby level of reception.

4. A method for standby control in a base station as set forth in claim 3, wherein the standby level of reception comprises a standby enabling level and a standby disabling level.

5. A method for standby control in a base station as set forth in claim 3, wherein the standby level of reception includes at least one of a normal communication standby level of reception, emergency communication standby level of reception, and data transfer standby level of reception.

6. A method for standby control in a base station as set forth in claim 5, wherein standby levels of reception are indicated by a standby enabling level and a standby disabling level.

7. A method for standby control in a base station as set forth in claim 3, wherein when one of the mobile units is a dual car-mounted/handheld unit, a car-mounted unit standby level of reception and handheld unit standby level of reception are used as standby levels of reception.

8. A method for standby control in a base station as set forth in claim 7, wherein when the mobile unit is a dual car-mounted/handheld unit, the standby level of reception is comprised of a high speed motion car-mounted unit standby level of reception and low speed motion car-mounted unit standby level of reception and a high speed motion handheld unit standby level of reception and a low speed motion handheld unit standby level of reception.

9. A method for standby control in a base station as set forth in claim 3, wherein the standby level of reception is indicated by an absolute value.

10. A method for standby control in a base station as set forth in claim 3, wherein the standby level of reception includes a normal communication standby level of reception, an emergency communication standby level of reception, and a data transfer standby level of reception, the emergency communication standby level of reception and the data transfer standby level of reception are indicated by relative values based on the value of the normal communication standby level of reception as a reference value.

11. A method for standby control in a base station as set forth in claim 2, further comprising determining a standby level of reception by a predetermined bit error rate.

12. A method for standby control in a mobile unit which performs standby control, comprising:
receiving broadcast information including various types of standby conditions from a base station;
recognizing by the mobile unit which mode of a plurality of modes of communication the mobile unit is in;
extracting from the broadcast information the standby condition corresponding to the recognized mode of communication; and
executing standby control under the extracted standby condition.

13. A method for standby control in a mobile unit as set forth in claim 12, wherein the mobile unit recognizes in which of the plurality of modes of communication the mobile unit is in accordance with a state of connection of a manual switch.

14. A method for standby control in a mobile unit as set forth in claim 13, wherein the mobile unit recognizes if the mobile unit is in a normal communication mode, emergency communication mode, or data transfer mode in accordance with the state of connection of a first manual switch.

15. A method for standby control in a mobile unit as set forth in claim 13, wherein the mobile unit recognizes if the mobile unit is in high speed motion communication mode or low speed motion communication mode in accordance with the state of connection of a second manual switch.

16. A method for standby control in a mobile unit as set forth in claim 13, wherein the mobile unit recognizes if the mobile unit is in a car-mounted unit communication mode or a handheld unit communication mode in accordance with the state of connection of a third manual switch.

17. A method for standby control in a mobile unit as set forth in claim 12, wherein the mobile unit automatically recognizes which mode of the plurality of modes of communication the mobile unit is in by an electric detection means.

18. A method for standby control in a mobile unit as set forth in claim 17, wherein the mobile unit automatically recognizes if the mobile unit is in normal communication mode, emergency communication mode, or data transfer mode in accordance with a first electric detection means.

19. A method for standby control in a mobile unit as set forth in claim 17, wherein the mobile unit monitors a pitch of variation of a level of reception of a signal from the base station, estimates the speed of motion of the mobile unit, and automatically recognizes if the mobile unit is in a high speed motion communication mode or low speed motion communication mode by a third electric detection means.

20. A method for standby control in a mobile unit as set forth in claim 17, wherein the mobile unit monitors if the mobile unit is connected to a car-mounted unit antenna or a handheld unit antenna and automatically recognizes if the mobile unit is in a car-mounted unit communication mode or the handheld unit communication mode by a fourth electric detection means.

21. A method for standby control in a mobile unit which performs standby control, said method comprising:
receiving broadcast information including various types of standby conditions from a base station;
recognizing bv the mobile unit which mode of the plurality of modes of communication the mobile unit is in by an electric detection means;
extracting from the broadcast information the standby condition corresponding to the recognized mode of communication;
executing standby control under the extracted standby condition; and
monitoring by the mobile unit a telephone number and automatically recognizing if the mobile unit is in a normal communication mode or an emergency communication mode in accordance with a second electric detection means.

22. A method for standby control in a mobile unit which performs standby control, said method comprising:
receiving broadcast information including various types of standby conditions from a base station;
recognizing by the mobile unit which mode of the plurality of modes of communication the mobile unit is in by an electric detection means;
extracting from the broadcast information the standby condition corresponding to the recognized mode of communication;
executing standby control under the extracted standby condition;
monitoring by the mobile unit if the mobile unit is connected to a car-mounted unit power source or a handheld unit power source; and
automatically recognizing if the mobile unit is in a car-mounted unit communication mode or a handheld unit communication mode by a fifth electric detection means.

23. A mobile unit which performs standby control by receiving broadcast information including various types of standby conditions indicating a standby enabling condition starting a call and a standby disabling condition inhibiting a call and from a base station, provided with a manual switch for an operator to set which of a plurality of modes of communication the mobile unit is to be in, by extracting from the broadcast information the standby condition corresponding to the mode of communication which the mobile unit is in, by modifying the standby conditions of the mobile unit and by executing standby control under the extracted standby condition and based on the modified standby conditions.

24. A mobile unit which performs standby control by receiving broadcast information including various types of standby conditions indicating a standby enabling condition starting a call and a standby disabling condition inhibiting a call and from a base station, provided with an electric detection means for enabling the mobile unit to automatically recognize which of a plurality of modes communication the mobile unit is in, by extracting the standby condition corresponding to the recognized mode of communication and by modifying the standby conditions of the mobile unit and by executing standby control under the extracted standby condition and based on the modified standby conditions.

25. A method for standby control in a base station and a mobile unit in a mobile telecommunication network comprised of at least one mobile unit and a base station, said method comprising:

transmitting from the base station to the mobile unit via a radio control channel broadcast information required for standby control of the mobile unit, the broadcast information for standby control including a plurality of standby condition types conforming to different modes of communication of the mobile unit; and controlling operation in the mobile unit, including:
a) recognizing by the mobile unit the several modes of communication of the mobile unit, b) extracting from the broadcast information the standby condition corresponding to the recognized mode of communication, and c) executing standby control under the extracted standby condition.

* * * * *

UNITED STATES PATENT AND TRADEMARK OFFICE
CERTIFICATE OF CORRECTION

PATENT NO.:   6,032,050
DATED     :   February 29, 2000
INVENTOR(S):  Hajime HASEGAWA It is certified that error appears in the above-identified patent and that said Letters Patent is hereby corrected as shown below:

Col. 18, line 12, change "bv" to --by--.

Signed and Sealed this

Sixth Day of February, 2001

Attest:

Q. TODD DICKINSON

Attesting Officer

Director of Patents and Trademarks